United States Patent
Chen et al.

(10) Patent No.: US 9,718,457 B2
(45) Date of Patent: Aug. 1, 2017

(54) HYBRID ELECTRICAL VEHICLE AND METHOD FOR CONTROLLING THE SAME

(71) Applicant: BYD COMPANY LIMITED, Shenzhen (CN)

(72) Inventors: Hao Chen, Shenzhen (CN); Ou Ruan, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 0 days.

(21) Appl. No.: 14/917,878

(22) PCT Filed: Sep. 5, 2014

(86) PCT No.: PCT/CN2014/086023
§ 371 (c)(1),
(2) Date: Mar. 9, 2016

(87) PCT Pub. No.: WO2015/032345
PCT Pub. Date: Mar. 12, 2015

(65) Prior Publication Data
US 2016/0221569 A1 Aug. 4, 2016

(30) Foreign Application Priority Data

Sep. 9, 2013 (CN) .......................... 2013 1 0409911
Sep. 26, 2013 (CN) .......................... 2013 1 0444535

(51) Int. Cl.
*G06F 17/00* (2006.01)
*B60W 20/13* (2016.01)
(Continued)

(52) U.S. Cl.
CPC .............. *B60W 20/13* (2016.01); *B60K 6/54* (2013.01); *B60W 10/06* (2013.01); *B60W 10/08* (2013.01);
(Continued)

(58) Field of Classification Search
CPC ...... B60W 20/13; B60W 10/06; B60W 10/08; B60W 10/26; B60W 20/00; B60W 20/40;
(Continued)

(56) References Cited

U.S. PATENT DOCUMENTS 5,927,415 A  7/1999  Ibaraki et al.
6,137,250 A  10/2000  Hirano et al.
(Continued)

FOREIGN PATENT DOCUMENTS

CN  1528612 A  9/2004
CN  101161523 A  4/2008
(Continued)

OTHER PUBLICATIONS

International Search Report and Written Opinion from International Application No. PCT/CN2014/085825 dated Nov. 13, 2014.
(Continued)

*Primary Examiner* — McDieunel Marc
(74) *Attorney, Agent, or Firm* — Alston & Bird LLP

(57) ABSTRACT

A hybrid electrical vehicle and a method for controlling a hybrid electrical vehicle are provided. The vehicle includes: a transmission device (1) connected with wheels (2a and 2b) of the hybrid electrical vehicle; an engine (3) and a gearbox (4), wherein the engine (3) is connected with the transmission device (1) via the gearbox (4); an electric motor (5) and a gear reducer (6), wherein the electric motor (5) is connected with the transmission device (1) via the gear reducer (6); a power battery (7) configured to supply power to the electric motor (5); and a control module configured to start the engine (3) and the electric motor (5) according to a working mode selected by a user from a plurality of working modes, and to control the vehicle to switch between the plurality of working modes according to a driving state of the vehicle and/or a working state of the power battery.

21 Claims, 9 Drawing Sheets

(51) Int. Cl.
*B60K 6/54* (2007.10)
*B60W 10/08* (2006.01)
*B60W 20/00* (2016.01)
*B60W 10/06* (2006.01)
*B60W 10/26* (2006.01)
*B60W 20/40* (2016.01)

(52) U.S. Cl.
CPC ............ *B60W 10/26* (2013.01); *B60W 20/00* (2013.01); *B60W 20/40* (2013.01); *B60W 2510/242* (2013.01); *B60W 2540/00* (2013.01); *B60W 2710/0666* (2013.01); *B60W 2710/0677* (2013.01); *B60W 2710/083* (2013.01); *B60W 2710/244* (2013.01); *Y02T 10/6286* (2013.01); *Y10S 903/93* (2013.01)

(58) Field of Classification Search
CPC ....... B60W 2510/242; B60W 2540/00; B60W 2710/0677; B60W 2710/244; B60W 2710/083; B60K 6/54; Y02T 10/6286
USPC ......................................................... 701/22
See application file for complete search history.

(56) References Cited

U.S. PATENT DOCUMENTS

| | | | |
|---|---|---|---|
| 6,177,773 B1 | 1/2001 | Nakano et al. | |
| 6,554,088 B2 | 4/2003 | Severinsky et al. | |
| 8,018,190 B2* | 9/2011 | Claeys | B60K 6/52 318/139 |
| 8,657,045 B2 | 2/2014 | Wang et al. | |
| 8,834,317 B2 | 9/2014 | Wang et al. | |
| 9,145,146 B2 | 9/2015 | Bureau et al. | |
| 2001/0039230 A1 | 11/2001 | Severinsky et al. | |
| 2004/0210356 A1 | 10/2004 | Wilton et al. | |
| 2005/0256631 A1 | 11/2005 | Cawthorne et al. | |
| 2006/0021808 A1 | 2/2006 | McGee et al. | |
| 2006/0108956 A1 | 5/2006 | Clark et al. | |
| 2006/0231304 A1 | 10/2006 | Severinsky et al. | |
| 2007/0112496 A1 | 5/2007 | Ji | |
| 2007/0173372 A1 | 7/2007 | Ueno | |
| 2007/0293994 A1 | 12/2007 | Zerbini et al. | |
| 2008/0029319 A1 | 2/2008 | Fleckner et al. | |
| 2008/0091314 A1 | 4/2008 | Hayashi et al. | |
| 2008/0105477 A1 | 5/2008 | Abe | |
| 2008/0121443 A1 | 5/2008 | Clark et al. | |
| 2008/0146407 A1 | 6/2008 | Tuckfield | |
| 2010/0030416 A1 | 2/2010 | Jinno | |
| 2010/0038159 A1 | 2/2010 | Jinno et al. | |
| 2010/0063661 A1 | 3/2010 | Saito | |
| 2010/0106355 A1 | 4/2010 | Hattori et al. | |
| 2011/0071748 A1* | 3/2011 | Nishigaki | F01L 1/3442 701/105 |
| 2011/0082611 A1 | 4/2011 | Shiba | |
| 2011/0130906 A1* | 6/2011 | Mayer | G07C 5/008 701/22 |
| 2011/0130916 A1* | 6/2011 | Mayer | G07C 5/008 701/31.4 |
| 2011/0166733 A1 | 7/2011 | Yu et al. | |
| 2011/0172865 A1 | 7/2011 | Liang et al. | |
| 2011/0269599 A1 | 11/2011 | Nakasako | |
| 2011/0276209 A1 | 11/2011 | Suganuma et al. | |
| 2011/0288708 A1 | 11/2011 | Katono et al. | |
| 2012/0082536 A1* | 4/2012 | Kawashima | B60W 10/08 414/694 |
| 2012/0083948 A1 | 4/2012 | Tate, Jr. et al. | |
| 2012/0323430 A1 | 12/2012 | Nakamura et al. | |
| 2013/0030634 A1 | 1/2013 | Endo et al. | |
| 2013/0060409 A1 | 3/2013 | Matsushita et al. | |
| 2013/0124026 A1 | 5/2013 | Ueno et al. | |
| 2013/0173107 A1 | 7/2013 | Kokon | |
| 2013/0245912 A1 | 9/2013 | Boot | |
| 2014/0076085 A1 | 3/2014 | Walters et al. | |
| 2014/0274522 A1* | 9/2014 | Davis | B60K 6/12 475/2 |
| 2014/0288757 A1 | 9/2014 | Hirasawa et al. | |
| 2015/0002053 A1 | 1/2015 | Endo et al. | |
| 2015/0126329 A1* | 5/2015 | Johri | B60W 10/08 477/5 |
| 2015/0134160 A1* | 5/2015 | Liang | B60W 10/06 701/22 |
| 2016/0221570 A1* | 8/2016 | Chen | B60W 30/182 |
| 2016/0221571 A1* | 8/2016 | Chen | B60W 10/06 |
| 2016/0325728 A1 | 11/2016 | Yang et al. | |
| 2017/0036662 A1* | 2/2017 | Chen | B60W 20/13 |

FOREIGN PATENT DOCUMENTS

| | | |
|---|---|---|
| CN | 101186209 A | 5/2008 |
| CN | 101402314 A | 4/2009 |
| CN | 201214410 Y | 4/2009 |
| CN | 101618718 A | 1/2010 |
| CN | 101652538 A | 2/2010 |
| CN | 101674950 A | 3/2010 |
| CN | 101687507 A | 3/2010 |
| CN | 101830219 A | 9/2010 |
| CN | 101830222 A | 9/2010 |
| CN | 102009652 A | 4/2011 |
| CN | 102030005 A | 4/2011 |
| CN | 102126496 A | 7/2011 |
| CN | 102166963 A | 8/2011 |
| CN | 102180169 A | 9/2011 |
| CN | 102224047 A | 10/2011 |
| CN | 102267458 A | 12/2011 |
| CN | 102336148 A | 2/2012 |
| CN | 102358283 A | 2/2012 |
| CN | 102427980 A | 4/2012 |
| CN | 102490722 A | 6/2012 |
| CN | 102612448 A | 7/2012 |
| CN | 102658817 A | 9/2012 |
| CN | 102712313 A | 10/2012 |
| CN | 102745092 A | 10/2012 |
| CN | 102849064 A | 1/2013 |
| CN | 102849066 A | 1/2013 |
| CN | 103158695 A | 6/2013 |
| CN | 103189258 A | 7/2013 |
| CN | 103201153 A | 7/2013 |
| CN | 103249624 A | 8/2013 |
| CN | 103269926 A | 8/2013 |
| DE | 102007016515 A1 | 10/2008 |
| DE | 102009039615 | 3/2011 |
| DE | 102010060681 | 5/2012 |
| DE | 102011122307 | 6/2013 |
| EP | 0 867 323 A2 | 9/1998 |
| EP | 1 813 794 A1 | 8/2007 |
| EP | 2 063 088 A1 | 5/2009 |
| EP | 2 112 015 A1 | 10/2009 |
| EP | 2 127 981 A1 | 12/2009 |
| EP | 2 133 252 A1 | 12/2009 |
| EP | 2 168 827 A1 | 3/2010 |
| EP | 2 226 229 A1 | 9/2010 |
| EP | 2 308 732 A1 | 4/2011 |
| EP | 2 371 645 | 10/2011 |
| EP | 2 371 646 A1 | 10/2011 |
| EP | 2 409 871 A2 | 1/2012 |
| EP | 2 460 704 A1 | 6/2012 |
| EP | 2 546 089 A2 | 1/2013 |
| JP | 2006-050704 A | 2/2006 |
| JP | 2006-094626 | 4/2006 |
| JP | 2006-183547 A | 7/2006 |
| JP | 2008-168700 | 7/2008 |
| JP | 2010-179789 A | 8/2010 |
| JP | 2010-241260 | 10/2010 |
| JP | 2010-242575 A | 10/2010 |
| JP | 2011-189814 A | 9/2011 |
| JP | 2011-213166 | 10/2011 |
| JP | 2012-086701 A | 5/2012 |
| JP | 2012-091563 | 5/2012 |
| JP | 2013-086704 | 5/2013 |
| JP | WO 2013/072992 A1 | 4/2015 |
| KR | 100887797 B1 | 3/2009 |
| WO | WO 2008/108498 A1 | 9/2008 |

(56) References Cited

FOREIGN PATENT DOCUMENTS

| WO | WO 2009/008546 A1 | 1/2009 |
|---|---|---|
| WO | WO-2010/143077 A2 | 12/2010 |
| WO | WO 2012/059999 A1 | 5/2012 |
| WO | WO-2013/110706 A1 | 8/2013 |

OTHER PUBLICATIONS

International Search Report and Written Opinion from International Application No. PCT/CN2014/085826 dated Nov. 15, 2014.
International Search Report and Written Opinion from International Application No. PCT/CN2014/085828 dated Dec. 1, 2014.
International Search Report and Written Opinion from International Application No. PCT/CN2014/085829 dated Dec. 3, 2014.
International Search Report and Written Opinion from International Application No. PCT/CN2014/085830 dated Nov. 19, 2014.
International Search Report and Written Opinion from International Application No. PCT/CN2014/086018 dated Dec. 17, 2014.
International Search Report and Written Opinion from International Application No. PCT/CN2014/086023 dated Dec. 12, 2014.
International Search Report and Written Opinion from International Application No. PCT/CN2014/086025 dated Dec. 10, 2014.
International Search Report and Written Opinion from International Application No. PCT/CN2014/086031 dated Dec. 3, 2014.
Office Action from Chinese Patent Application No. 201310405003.9 dated Dec. 11, 2013.
Office Action from Chinese Patent Application No. 201310444535.3 dated Dec. 11, 2013.
JPO machine translation of JP 2010-241260 (original JP document published Oct. 28, 2010), 16 pages.
EPO machine translation of DE 102010060681 (original DE document published May 24, 2012), 4 pages.
Office Action for U.S. Appl. No. 14/917,884, dated Apr. 3, 2017, 35 pages.
Office Action for U.S. Appl. No. 14/917,895, dated Apr. 7, 2017, 31 pages.
"Cruise Control—Wikipedia, the free encyclopedia." [retrieved May, 8, 2017]. Retrieved via the Internet Archive Wayback Machine at <URL:https://web.archive.org/web/20130828091003/https://en.wikipedia.org/wiki/Cruise_control>. (dated Aug. 13, 2013). 8 pages.
Extended European Search Report for European Patent Application No. 14842364.3, dated Apr. 11, 2017, 11 pages.
Extended European Search Report for European Patent Application No. 14842235.5, dated Apr. 20, 2017, 8 pages.
Extended European Search Report for European Patent Application No. 14842391.6, dated Apr. 20, 2017, 9 pages.
Extended European Search Report for European Patent Application No. 14842721.4, dated Apr. 20, 2017, 8 pages.
Extended European Search Report for European Patent Application No. 14843096-0, dated Apr. 20, 2017, 8 pages.
Extended European Search Report for European Patent Application No. 14841488.1, dated May 4, 2017, 9 pages.
Extended European Search Report for European Patent Application No. 14842854.3, dated May 11, 2017, 10 pages.

\* cited by examiner

HYBRID ELECTRICAL VEHICLE AND METHOD FOR CONTROLLING THE SAME

CROSS REFERENCE TO RELATED APPLICATION

This application claims priority to and benefits of Chinese Patent Application No. 201310444535.3, filed with State Intellectual Property Office on Sep. 26, 2013, and Chinese Patent Application No. 201310409911.5, filed with State Intellectual Property Office on Sep. 9, 2013, the entire content of which are incorporated herein by reference.

FIELD

Embodiments of the present disclosure generally relate to a vehicle technology field, and more particularly, to a hybrid electrical vehicle and a method for controlling the hybrid electrical vehicle.

BACKGROUND

A hybrid electrical vehicle (HEV) refers to a vehicle equipped with two types of power sources, i.e., a thermal power source (generating power by a conventional gasoline engine or diesel engine) and an electric power source (generating power by a battery and an electric motor). With disposing the electric motor in the hybrid electrical vehicle, the power system can be adjusted flexibly according to the practical working conditions of the hybrid electrical vehicle and the engine can keep working in regions with the optimum comprehensive properties, thus reducing the oil wear and the emission.

Some of the existing hybrid electrical vehicles adopt a series-parallel hybrid power system, which is characterized by disposing one mechanical gear shifting mechanism in the internal combustion engine system and the electric motor drive system respectively. The two mechanical gear shifting mechanisms are connected via a planetary wheel structure, such that the rotating speed relationship between the internal combustion engine system and the electric motor drive system can be adjusted synthetically.

However, the driving mode of the conventional hybrid electrical vehicle is simplex and the driver cannot select the driving mode according to individual driving habits, the long term and constant driving condition. For example, considering that Asians often live in concentrated districts and have a relatively constant driving path to and from work which is mostly less than 50 km, it is very appropriate to drive in a pure electric mode. However, the conventional hybrid electrical vehicle reduces the oil wear by adjusting the engine via the electric motor instead of eliminating the oil wear totally. Therefore, the conventional hybrid electrical vehicle generally does not have the manual electrical vehicle (EV) mode switching function. Even if the conventional electrical vehicle has the manual EV mode switching function, the pure electric driving mileage of the vehicle is short due to the limitation of the electric quantity of the battery.

Moreover, since the purpose of the conventional hybrid electrical vehicle is to reduce the oil wear, the electric motor and engine with a high power and a high torque will not be selected, and thus the power performance of the hybrid electrical vehicle is low and the driving fun is greatly reduced. For example, some hybrid electrical vehicles take more than 10 s to accelerate from 0 to 100 km/h and provide a poor high speed performance.

Furthermore, some conventional hybrid electrical vehicles adopt the series-parallel structure and the method for controlling the series-parallel structure, and the strategy in which the engine drives the vehicle solely does not exist. In other words, even if in the relatively economical working regions, the engine still charges the battery via a first electric motor MG1 and adjusts the rotating speed thereof via the first electric motor MG1 to implement the gear shift; moreover, in the heavy load acceleration condition, due to the limitation of the battery capacity, only if a part of the power of the engine is used to drive the first electric motor MG1 to generate power, can the engine provide the electric energy to the second electric motor MG2 together with the battery. The above facts reduce the driving efficiency of the engine. In addition, in the engine stop-start strategy, the predetermined demanded power and speed threshold are relatively low, and the speed switching condition is set as a point instead of an internal, thus resulting in a premature and frequent start of the engine.

In addition, some conventional hybrid electrical vehicles do not adopt the plug-in structure due to the small capacity of the battery, and the electric quantity of the battery is converted from the gasoline totally, thus increasing the cost. Moreover, the series-parallel structure is complex and it is difficult to match with the Electronic Continuously Variable Transmission (ECVT), and the cost is high.

SUMMARY

Embodiments of the present disclosure seek to solve at least one of the problems existing in the related art to at least some extent.

An object of the present disclosure is to provide a hybrid electrical vehicle including an engine and an electric motor connected in parallel, which can greatly improve an economic performance on the premise of ensuring a power performance of the hybrid electrical vehicle, and can improve an operability of the vehicle and enhance a driving fun of a driver.

Another object of the present disclosure is to provide a method for controlling a hybrid electrical vehicle.

In order to achieve above objects, embodiments of a first aspect of the present disclosure provide a hybrid electrical vehicle, including: a transmission device connected with wheels of the hybrid electrical vehicle; an engine and a gearbox, in which the engine is connected with the transmission device via the gearbox; an electric motor and a gear reducer, in which the electric motor is connected with the transmission device via the gear reducer; a power battery configured to supply power to the electric motor; and a control module configured to control the electric motor and the engine according to a working mode selected by a user from a plurality of working modes, and to control the hybrid electrical vehicle to switch between the plurality of working modes according to a driving state of the hybrid electrical vehicle and/or a working state of the power battery, in which the plurality of working modes comprise an electrical-economical mode, an electrical-sport mode, a hybrid electrical-economical mode and a hybrid electrical-sport mode.

With the hybrid electrical vehicle according to embodiments of the present disclosure, the engine and the electric motor are connected in parallel, which can effectively improve an energy utilization factor as compared with a series connection structure adopted in a power system of the conventional hybrid electrical vehicle. Moreover, the parallel connection is simple in structure and can avoid a complex ECVT match in a series-parallel connection, which reduces a risk of driving uncomfortably caused by the match failure, and thus the economy of the hybrid electrical vehicle is greatly improved on the premise of ensuring the power performance of the hybrid electrical vehicle. In addition, the switching between a plurality of working modes provides the driver with a high operability and much driving fun.

In order to achieve the above objects, embodiments of a second aspect of the present disclosure provide a method for controlling a hybrid electrical vehicle, including: receiving a working mode selected by a user of the hybrid electrical vehicle from a plurality of working modes, in which the working modes include an electrical-economical mode, an electrical-sport mode, a hybrid electrical-economical mode and a hybrid electrical-sport mode; controlling the hybrid electrical vehicle to work in the working mode selected by the user; detecting a driving state of the hybrid electrical vehicle and/or a working state of a power battery; and controlling the hybrid electrical vehicle to switch between the plurality of working modes according to driving state of the hybrid electrical vehicle and/or the working state of the power battery.

With the method according to embodiments of the present disclosure, by providing a plurality of working modes, a driving requirement of the user in different working conditions can be satisfied, i.e., not only pure electric consumption in a city working condition can be satisfied, but also power performance requirement in a suburban district working condition can be satisfied, and thus the hybrid electrical vehicle can be driven according to subjective operation intentions of the user and the driving fun is improved. Moreover, the method for controlling the hybrid electrical vehicle is simple and reliable and is easy to operate by users.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
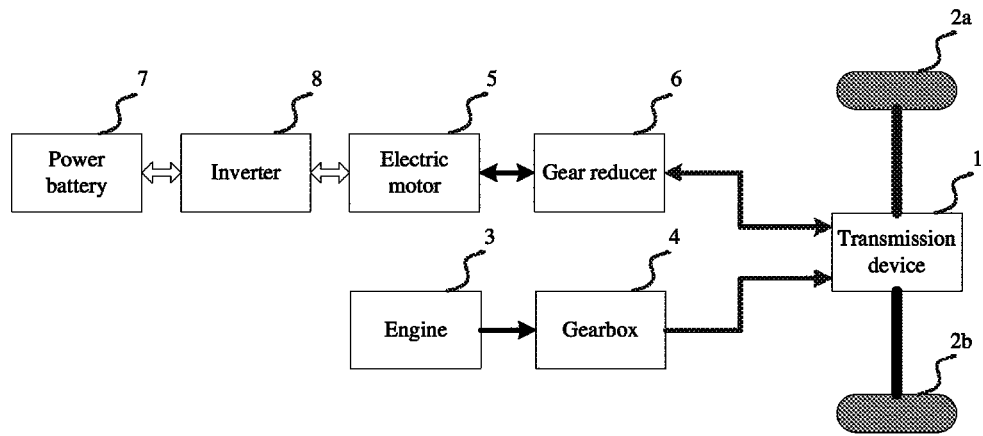
FIG. 1 is a schematic diagram of a hybrid electrical vehicle according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

The following description provides a plurality of embodiments or examples configured to achieve different structures of the present disclosure. In order to simplify the publishment of the present disclosure, components and dispositions of the particular embodiment are described in the following, which are only explanatory and not construed to limit the present disclosure. In addition, the present disclosure may repeat the reference number and/or letter in different embodiments for the purpose of simplicity and clarity, and the repeat does not indicate the relationship of the plurality of embodiments and/or dispositions. Moreover, in description of the embodiments, the structure of the second characteristic "above" the first characteristic may include an embodiment formed by the first and second characteristic contacted directly, and also may include another embodiment formed between the first and the second characteristic, in which the first characteristic and the second characteristic may not contact directly.

In the description of the present disclosure, unless specified or limited otherwise, it should be noted that, terms "mounted," "connected" and "coupled" may be understood broadly, such as electronic connection or mechanical connection, inner communication between two elements, direct connection or indirect connection via intermediary. These having ordinary skills in the art should understand the specific meanings in the present disclosure according to specific situations.

With reference to the following descriptions and drawings, these and other aspects of embodiments of the present disclosure will be distinct. In the descriptions and drawings, some particular embodiments are described in order to show means of the principles of embodiments according to the present disclosure, however, it should be appreciated that the scope of embodiments according to the present disclosure is not limited. On the contrary, embodiments of the present disclosure include all the changes, alternatives, and modifications falling into the scope of the spirit and principles of the attached claims.

In the following, a hybrid electrical vehicle and a method for controlling a hybrid electrical vehicle are described in detail with reference to drawings.

FIG. 1 is a schematic diagram of a hybrid electrical vehicle according to an embodiment of the present disclosure. As shown in FIG. 1, the hybrid electrical vehicle includes a transmission device 1, wheels 2a and 2b, an engine 3, a gearbox 4, an electric motor 5, a gear reducer 6, a power battery 7, an inverter 8 and a control module (not shown).

The transmission device 1 is configured to drive the wheels 2a and 2b of the hybrid electrical vehicle, the engine 3 is connected with the transmission device 1 via the gearbox 4, the electric motor 5 is connected with the transmission device 1 via the gear reducer 6, the power battery 7 is configured to provide power to the electric motor 5, and the control module controls the engine 3 and the electric motor 5 according a working mode selected by a user to start the hybrid electrical vehicle.

In an embodiment of the present disclosure, the above hybrid electrical vehicle is a plug-in dual-mode hybrid electrical vehicle, in which the engine 3 is an efficient turbocharged direct injection engine capable of outputting power for driving the vehicle, and the gearbox 4 is a double clutch gearbox capable of transmitting the power output from the engine 3, and the power battery 7 is connected with the inverter 8 via a DC (direct current) bus, and the inverter 8 is connected with the electric motor 5 via an AC three-phase wire, and then electric power and fuel power are coupled at the transmission device 1 and transmitted to the wheels 2a and 2b. The user can select the working mode of the hybrid electrical vehicle via an EV mode selecting button, a HEV mode selecting button and an operating mode selecting knob.

In an embodiment of the present disclosure, the working mode includes an electrical-economical mode (EV-eco mode), an electrical-sport mode (EV-s mode), a hybrid electrical-economical mode (HEV-eco mode) and a hybrid electrical-sport mode (HEV-s mode). The EV mode selecting button is configured to select an EV mode manually, the HEV mode selecting button is configured to select a HEV mode manually, and the operating mode selecting knob is configured to switch between an economical mode and a sport mode manually.

In an embodiment of the present disclosure, one of the EV mode and HEV mode can be selected and one of the economical mode and sport mode can be selected, and thus four working modes can be obtained by switching between each two modes, i.e., the EV-eco mode, the EV-s mode, the HEV-eco mode and the HEV-s mode can be obtained. In the EV mode, the hybrid electrical vehicle is in a pure electric power mode and the engine is kept out of work. In the HEV mode, the hybrid electrical vehicle is in a hybrid power mode, and the electric motor cooperates with the engine or drives the engine or adjusts the engine so as to make the engine to work in a working region with an optimal comprehensive property. In the economical mode, maximum outputs of the electric motor, the engine and the power battery are limited to ensure the electric motor, the engine and the power battery to work in a most economical region. In the Sport mode, a power performance of the hybrid electrical vehicle is satisfied preferentially, maximum outputs of the electric motor, the engine and the power battery are not limited, such that total power of the power system can be obtained.

Figure 2:
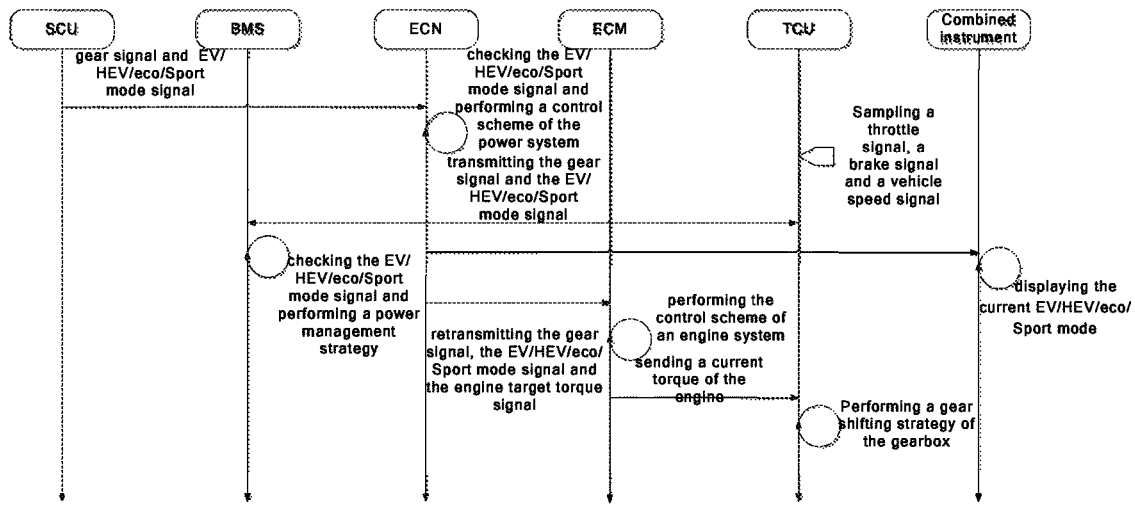
FIG. 2 is a schematic diagram showing a signal flow of a hybrid electrical vehicle according to an embodiment of the present disclosure.

FIG. 2 is a schematic diagram showing a signal flow of a hybrid electrical vehicle according to an embodiment of the present disclosure. As shown in FIG. 2, a gear controller (SCU) is configured to sample a gear signal and an EV/HEV/eco/Sport mode signal and to transmit the gear signal and the EV/HEV/eco/Sport mode signal to an electric motor controller (ECN). The electric motor controller (ECN) checks the EV/HEV/eco/Sport mode signal and forwards the gear signal and the EV/HEV/eco/Sport mode signal to a battery manager (BMS), an engine controller (ECM), a transmission controller (ECM) and a combination instrument. At the same time, the electric motor controller (ECN) performs a corresponding power system control scheme according to different mode strategies and sends an engine stop-start instruction and an engine target torque signal to the engine controller (ECM). The battery manager (BMS) checks the EV/HEV/eco/Sport mode signal and performs a power management strategy. The engine controller (ECM) performs an engine system control scheme and sends a current torque of the engine to the transmission controller (TCU). The transmission controller (TCU) samples a throttle signal, a brake signal and a vehicle speed signal and shifts the gear according to a gear shifting strategy of the gearbox. The combined instrument is configured to display the current EV/HEV/eco/Sport mode.

In an embodiment of the present disclosure, the control module controls the hybrid electrical vehicle to switch among the electrical-economical mode, the electrical-sport mode, the hybrid electrical-economical and the hybrid electrical-sport mode according to a driving state of the hybrid electrical vehicle and a working state of the power battery.

Figure 3:
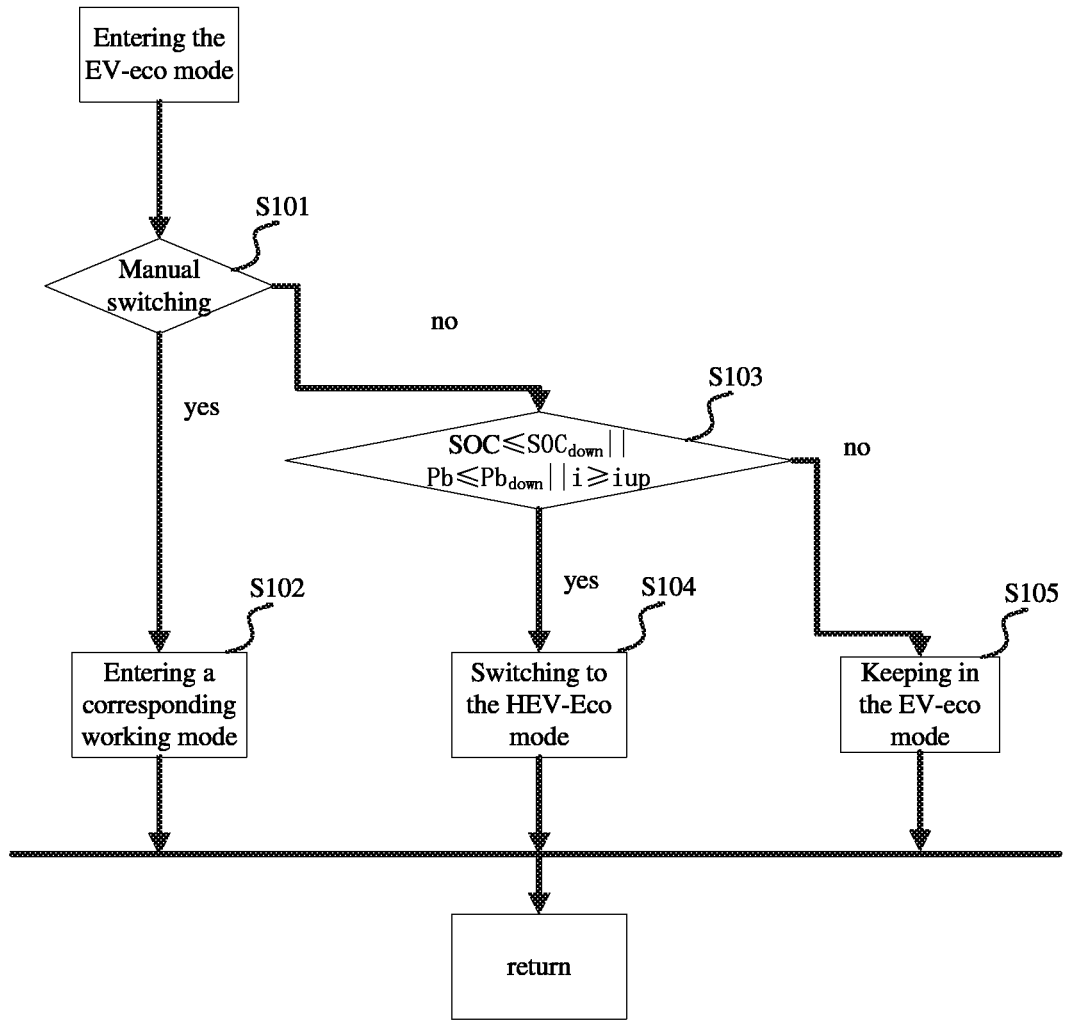
FIG. 3 is a flow chart of a method for controlling a hybrid electrical vehicle in an electrical-economical mode according to an embodiment of the present disclosure.

Specifically, in an embodiment of the present disclosure, as shown in FIG. 3, when the hybrid electrical vehicle is in the electrical-economical mode, the control module controls the hybrid electrical vehicle to switch to the hybrid electrical-economical mode from the electrical-economical mode if a current electric quantity of the power battery is less than or equal to a first electric quantity threshold such as 20%, or a maximum allowable discharge power of the power battery is less than or equal to a first power threshold such as 12 KW, or a slope detected by the hybrid electrical vehicle is greater than or equal to a maximum slope such as 15%.

In other words, in the embodiment as shown in FIG. 3, when the hybrid electrical vehicle is driving in the EV-eco mode and no mode switching condition is triggered, the power battery provides power to the electric motor to drive the vehicle and the engine is kept out of work. When the HEV mode selecting button is pressed manually, the hybrid electrical vehicle is switched to the HEV-eco mode; when the operating mode selecting knob is rotated to the Sport mode, the hybrid electrical vehicle is switched to the EV-s mode; when there is no manual input to the mode selecting buttons, the control module controls the hybrid electrical vehicle to switch to the HEV-eco mode automatically if the current electric quantity of the power battery is less than or equal to the first electric quantity threshold, or the maximum allowable discharge power of the power battery is less than or equal to the first power threshold, or the slope detected by the hybrid electrical vehicle is greater than or equal to the maximum slope. In the EV-eco mode, in order to improve an electric energy consumption efficiency to lengthen a driving mileage, a maximum output power of the electric motor is limited, moreover considering an accelerating ability of the hybrid electrical vehicle, a maximum output torque of the electric motor is not limited. In other words, when the hybrid electrical vehicle is in the EV-eco mode, the control module controls the hybrid electrical vehicle to drive with a limited power.

Figure 4:
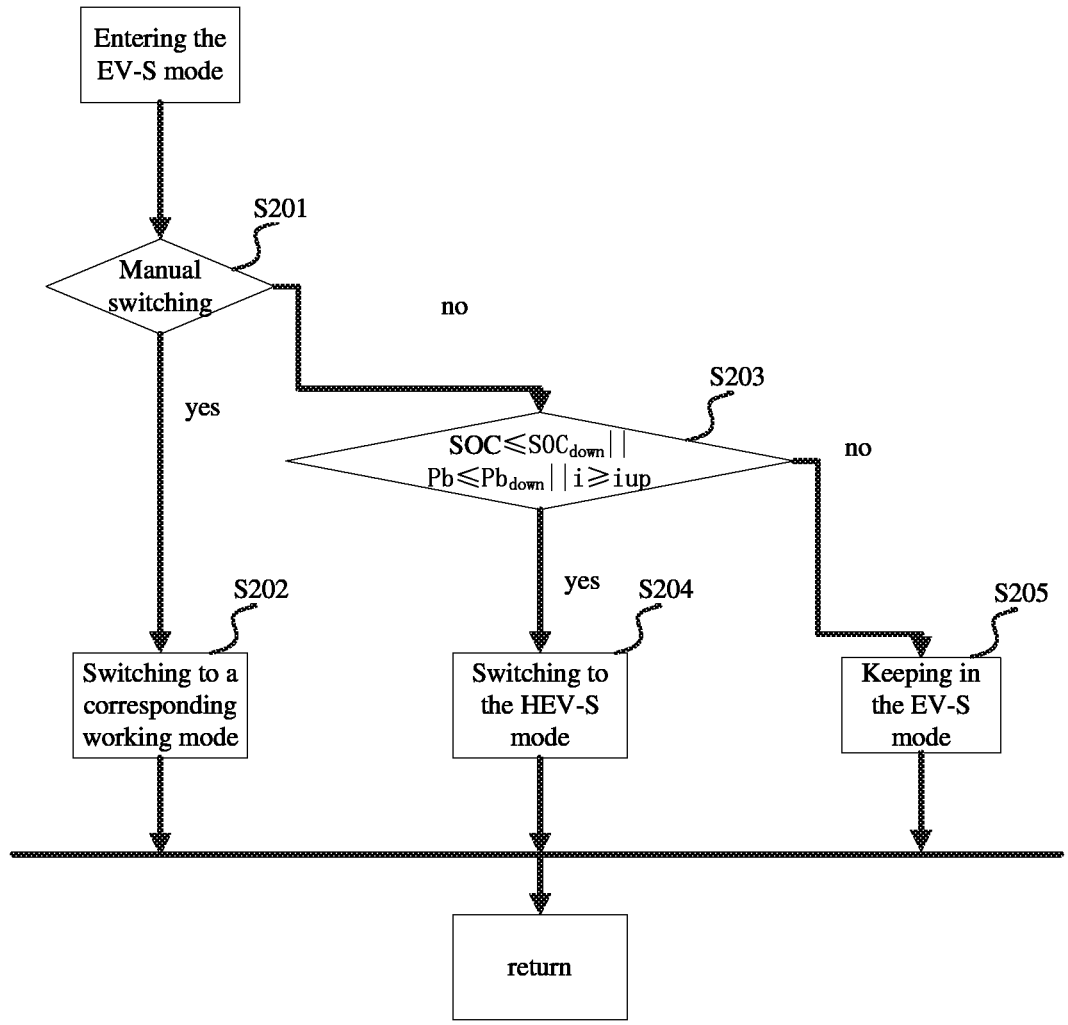
FIG. 4 is a flow chart of a method for controlling a hybrid electrical vehicle in an electrical-sport mode according to an embodiment of the present disclosure.

In another embodiment of the present disclosure, as shown in FIG. 4, when the hybrid electrical vehicle is in the electrical-sport mode, the control module controls the hybrid electrical vehicle to switch to the hybrid electrical-sport mode from the electrical-sport mode if the current electric quantity of the power battery is less than or equal to the first electric quantity threshold such as 20%, or the maximum allowable discharge power of the power battery is less than or equal to the first power threshold such as 12 KW, or the slope detected by the hybrid electrical vehicle is greater than or equal to the maximum slope such as 15%.

In other words, in the embodiment as shown in FIG. 4, when the hybrid electrical vehicle is driving in the EV-s mode and no mode switching condition is triggered, the power battery provides power to the electric motor to drive the vehicle and the engine is kept out of work. When the HEV mode selecting button is pressed manually, the hybrid electrical vehicle is switched to the HEV-s mode; when the operating mode selecting knob is rotated to the economical mode, the hybrid electrical vehicle is switched to the EV-eco mode; when there is no manual input to the mode selecting buttons, the control module controls the hybrid electrical vehicle to switch to the HEV-s mode automatically if the current electric quantity of the power battery is less than or equal to the first electric quantity threshold, or the maximum allowable discharge power of the power battery is less than or equal to the first power threshold, or the slope detected by the hybrid electrical vehicle is greater than or equal to the maximum slope. In the EV-s mode, the most important task is to obtain better power performance, and thus the output power of the electric motor is not limited.

As shown in FIGS. 3 and 4, when the hybrid electrical vehicle is in the electrical-economical mode or the electrical-sport mode and an mode switching instruction is input from the user (i.e., the mode switching condition is triggered), the control module controls the hybrid electrical vehicle to switch to a working mode corresponding to the mode switching instruction.

Figure 5:
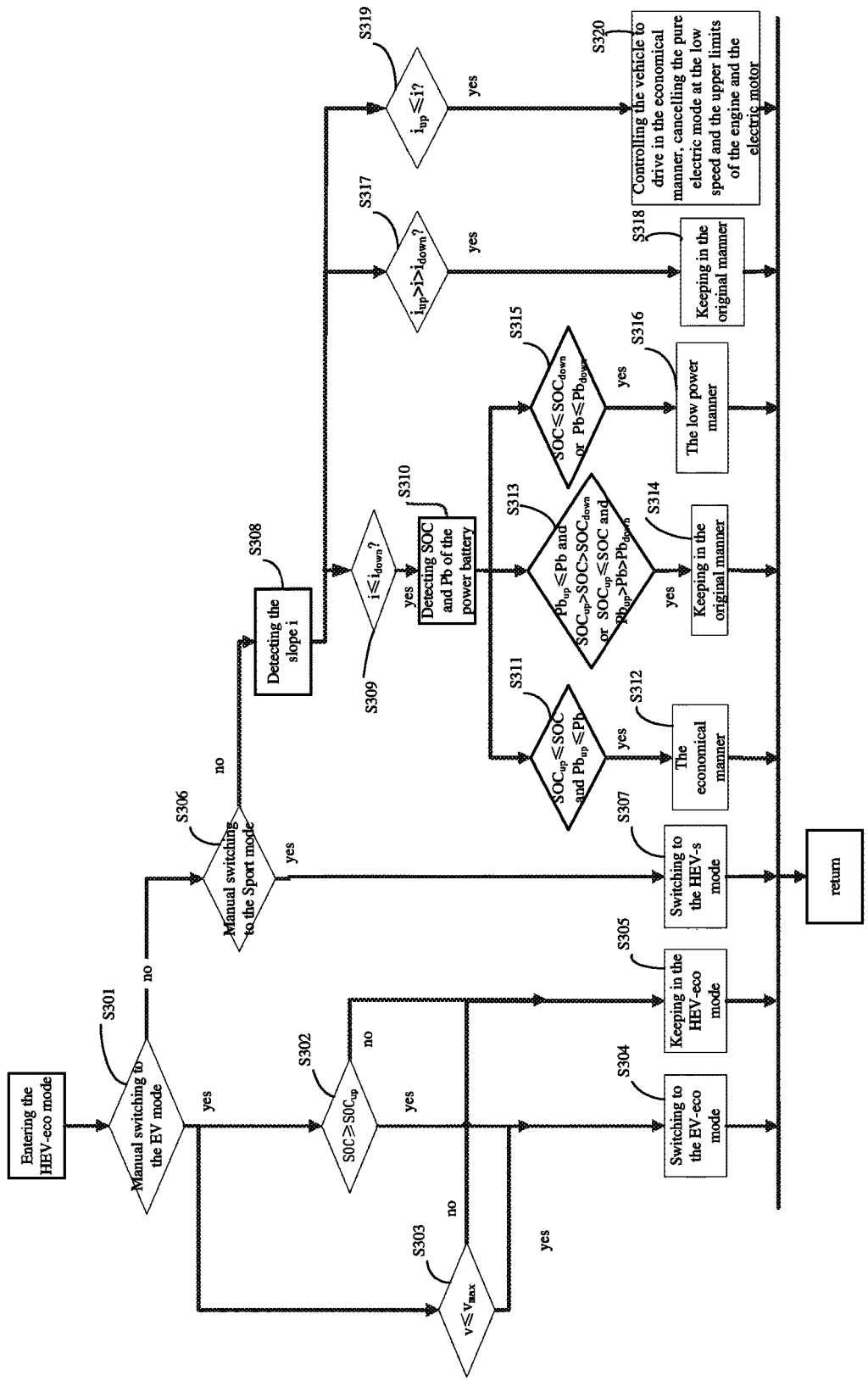
FIG. 5 is a flow chart of a method for controlling a hybrid electrical vehicle in a hybrid electrical-economical mode according to an embodiment of the present disclosure.

In yet another embodiment of the present disclosure, as shown in FIG. 5, when the hybrid electrical vehicle is in the hybrid electrical-economical mode and the control module receives the mode switching instruction to switch to the electrical-economical mode, the control module controls the hybrid electrical vehicle to switch to the electric-economical mode if the current electric quantity of the power battery is larger than or equal to a second electric quantity threshold such as 30%, or a current speed of the hybrid electrical vehicle is less than or equal to a first speed threshold such as 150 km/h.

Further, when the hybrid electrical vehicle is in the hybrid electrical-economical mode, the control module controls the hybrid electrical vehicle to work in a first manner if the slope detected by the hybrid electrical vehicle is less than or equal to a minimum slope such as 5%, and the current electric quantity of the power battery is larger than or equal to the second electric quantity threshold such as 30% and the maximum allowable discharge power of the power battery is larger than or equal to a second power threshold such as 30 kw. When the hybrid electrical vehicle is in the hybrid electrical-economical mode, the control module controls the hybrid electrical vehicle to work in a second manner if the slope detected by the hybrid electrical vehicle is less than or equal to the minimum slope such as 5% and the current electric quantity of the power battery is less than or equal to the first electric quantity threshold 20%, or if the current slope detected by the hybrid electrical vehicle is less than or equal to the minimum slope such as 5% and the maximum allowable discharge power of the power battery is less than or equal to the first power threshold such as 12 KW, in which the second electric quantity threshold is larger than the first electric quantity threshold, and the second power threshold is larger than the first power threshold. It should be noted that, in embodiments of the present disclosure, the first manner may be an economic manner, and the second manner may be a low power manner in which the engine drives the electric motor to generate power quickly so as to get rid of a low power state, such that the electric motor again has the ability of adjusting the working region of the engine, thus ensuring the economy of the hybrid electrical vehicle.

Figure 6:
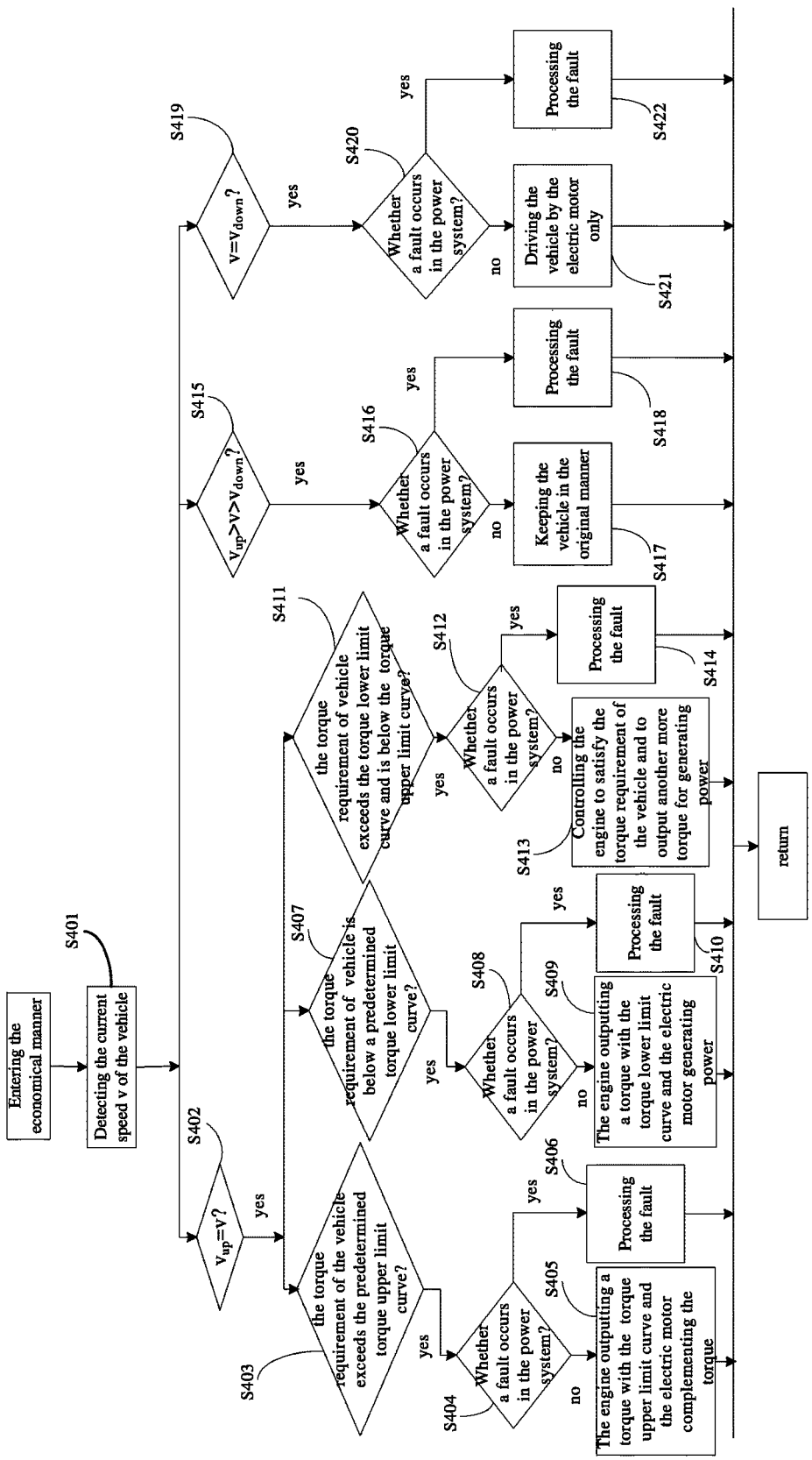
FIG. 6 is a flow chart of a method for controlling a hybrid electrical vehicle in an economical manner when the hybrid electrical vehicle is in a hybrid electrical-economical mode according to an embodiment of the present disclosure.
Figure 7:
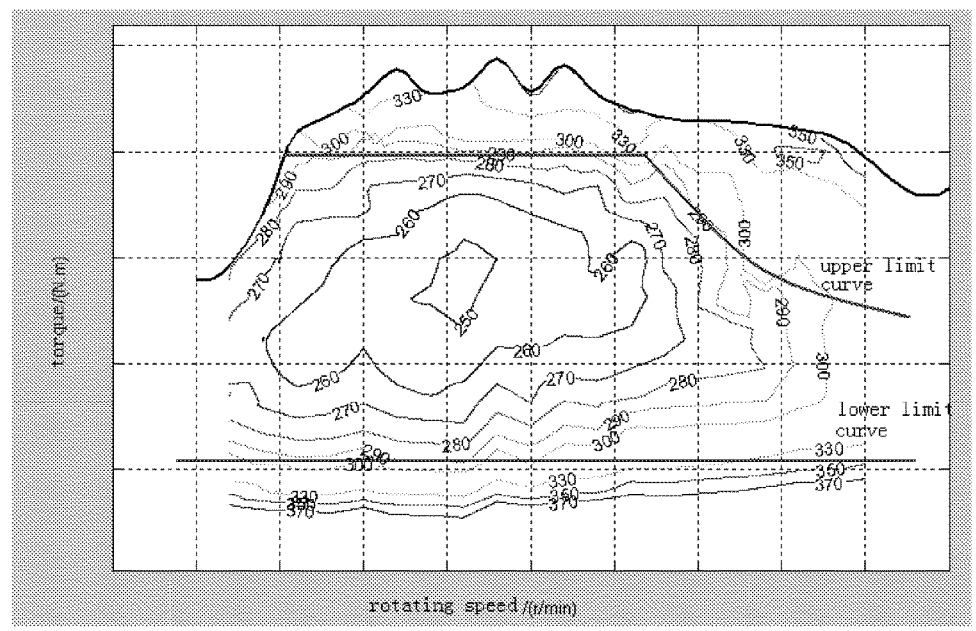
FIG. 7 is a schematic diagram showing a working region of an engine when a hybrid electrical vehicle is in a hybrid electrical-economical mode according to an embodiment of the present disclosure.
Figure 8:
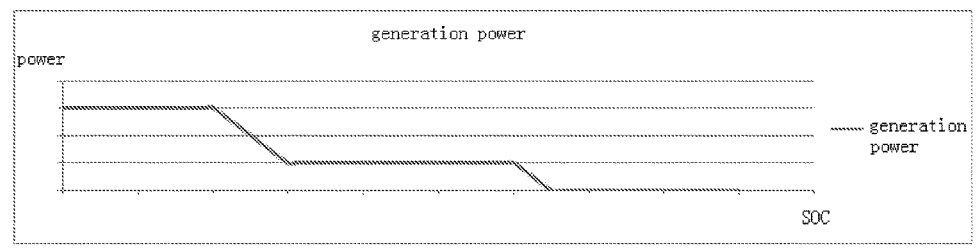
FIG. 8 is a schematic diagram showing a relationship between a generation power of an electric motor and an electric quantity of a power battery according to an embodiment of the present disclosure.

In an embodiment of the present disclosure, as shown in FIG. 6, when the hybrid electrical vehicle works in the economic manner and the speed of the hybrid electrical vehicle is less than or equal to a second speed threshold such as 15 km/h, the control module controls the hybrid electrical vehicle to switch to the electrical-economical mode. Further, when the hybrid electrical vehicle works in the economical manner and the speed of the hybrid electrical vehicle is larger than or equal to a third speed threshold such as 30 km/h, the control module controls the engine to output a torque with a predetermined torque upper limit curve and controls the electric motor to complement the torque if a torque requirement of the hybrid electrical vehicle exceeds the predetermined torque upper limit curve of the engine (i.e., a torque required to keep the hybrid electrical vehicle driving normally in a current state); the control module controls the engine to output a torque with a predetermined torque lower limit curve and controls the electric motor to generate power if the torque requirement of the hybrid electrical vehicle is below the predetermined torque lower limit curve of the engine; and the control module controls the engine to output a torque satisfying the torque requirement of the hybrid electrical vehicle and controls the electric motor to generate power if the torque requirement of the hybrid electrical vehicle exceeds the predetermined torque lower limit curve of the engine and is below the predetermined torque upper limit curve of the engine. In this embodiment of the present disclosure, the predetermined torque upper limit curve and the predetermined torque lower limit curve of the engine are shown in FIG. 7. When the torque requirement of the hybrid electrical vehicle exceeds the predetermined torque lower limit curve of the engine and is below the predetermined torque upper limit curve of the engine, a relationship between a generation power of the electric motor and the state of charge (SOC) of the power battery is shown in FIG. 8.

Figure 9:
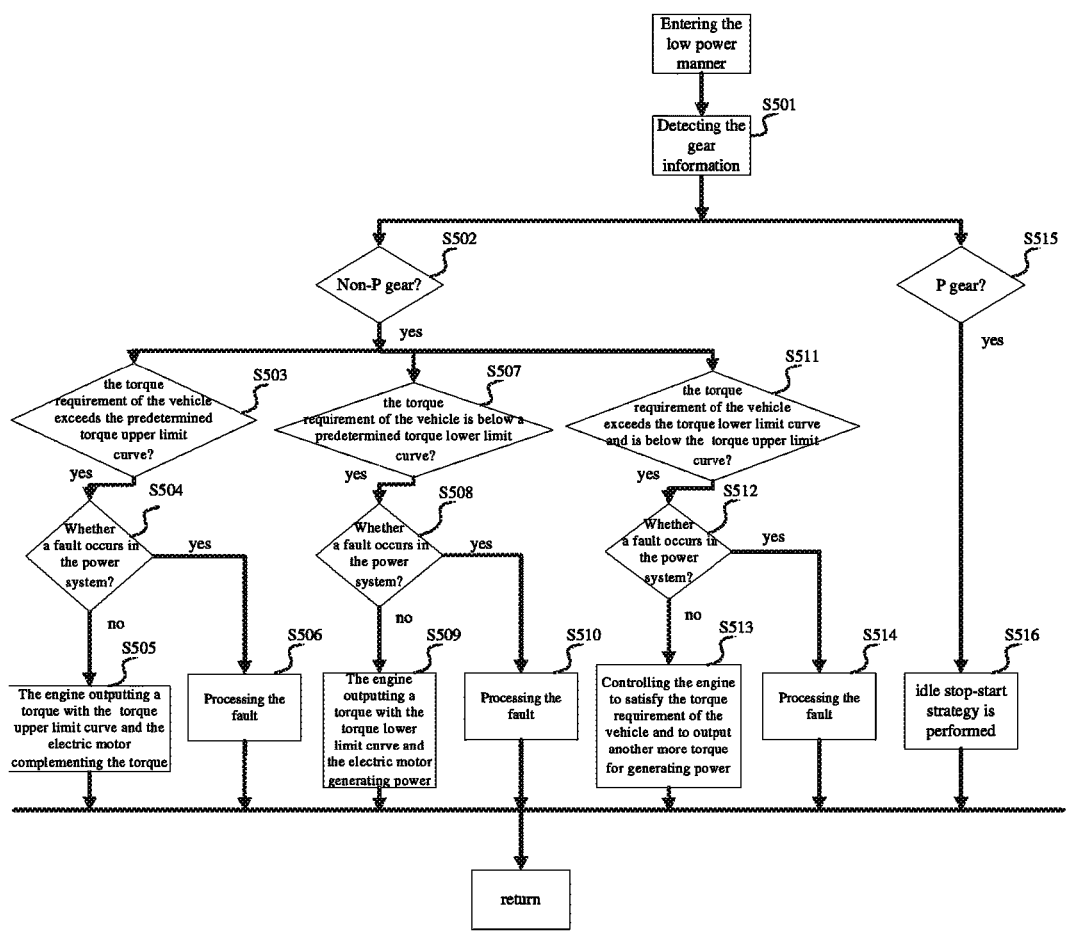
FIG. 9 is a flow chart of a method for controlling a hybrid electrical vehicle in a low power manner when the hybrid electrical vehicle is in a hybrid electrical-economical mode according to an embodiment of the present disclosure.

In an embodiment of the present disclosure, as shown in FIG. 9, when the hybrid electrical vehicle works in the low power manner and is in a non-P gear, the control module controls the engine to output a torque with the predetermined torque upper limit curve and controls the electric motor to complement the torque if the torque requirement of the hybrid electrical vehicle exceeds the predetermined torque upper limit curve of the engine; the control module controls the engine to output a torque with the predetermined torque lower limit curve and controls the electric motor to generate power if the torque requirement of the hybrid electrical vehicle is below the predetermined torque lower limit curve of the engine; and the control module controls the engine to output a torque satisfying the torque requirement of the hybrid electrical vehicle and controls the electric motor to generate power if the torque requirement of the hybrid electrical vehicle exceeds the predetermined torque lower limit curve of the engine and is below the predetermined torque upper limit curve of the engine. Moreover, when the hybrid electrical vehicle works in the low power manner and is in a P gear, the control module controls the hybrid electrical vehicle to enter an idle stop-start mode.

In other words, in the embodiment of the present disclosure as shown in FIG. 5, when the hybrid electrical vehicle is driving in the HEV-eco mode and the EV mode selecting button is pressed manually, the hybrid electrical vehicle is allowed to switch to the EV-eco mode only if the current electric quantity of the power battery is larger than or equal to the second electric quantity threshold such as 30% or the current speed of the hybrid electrical vehicle is less than or equal to the first speed threshold such as 150 km/h, otherwise the hybrid electrical vehicle cannot be switched to the EV-eco mode. When the hybrid electrical vehicle is driving in the HEV-eco mode and the operating mode knob is rotated to the sport mode, the hybrid electrical vehicle is switched to the HEV-s mode. When the hybrid electrical vehicle is in the HEV-eco mode and there is no manual input to the mode selecting buttons, the hybrid electrical vehicle is kept in the HEV-eco mode, and the engine and the electric motor perform power distribution in terms of the economic strategy and the low power strategy respectively according to region division of the electric quantity of the power battery and the maximum allowable discharge power of the power battery. As shown in FIG. 6, in the economic manner, if the current speed of the hybrid electrical vehicle is less than or equal to the second speed threshold such as 15 km/h, the hybrid electrical vehicle is in the pure electric mode; if the current speed of the hybrid electrical vehicle is larger than or equal to the third speed threshold such as 30 km/h, the engine takes part in driving the vehicle until the speed of the vehicle is reduced to the second speed threshold, and then the vehicle returns to the pure electric mode. In the pure electric mode, if the electric motor sends an alarm indicating the driving capability is not enough, the engine is started. As shown in FIG. 9, in the low power manner, the pure electric mode at a low speed is cancelled and an engine stop-start function with engaging the P gear is added. For the economic strategy and the low power strategy, control methods after the engine starts are the same, in which the torque upper limit curve of the engine and the torque lower limit curve of the engine are predetermined, as shown in FIG. 7. Principle of designing the curves is that a region between the upper limit curve and the lower limit curve includes as many most economical regions of the engine as possible. Since the engine has a poor economy outside the upper limit curve and the lower limit curve, in this region, the electric motor assists the engine to drive the vehicle. During a light load operation, under the premise of satisfying the requirement of the whole vehicle, the engine outputs the torque with the predetermined torque lower limit curve and the redundant torque is used to generate power. During a heavy load operation, the engine outputs the torque with the predetermined torque upper limit and the insufficient torque is complemented by the electric motor. If the electric motor has an insufficient charging-discharging capability due to the limitation of itself or the power battery, the electric motor charges or discharges with a maximum allowable capability of itself and the power battery, and the upper limit and lower limit of the output of the engine are cancelled and the engine outputs the torque with reference to requirements of the hybrid electrical vehicle. In the region between the upper limit curve and the lower limit curve, the electric motor mainly takes part in generating power, in which the generation power of the electric motor has a certain function relation with the current SOC of the power battery, as shown in FIG. 8. However, a total output torque of the engine does not exceed the predetermined torque upper limit curve, and if the electric motor has an insufficient charging-discharging capability due to the limitation of itself or the power battery, the electric motor charges or discharges with the maximum allowable capability of itself and the power battery. The above HEV-eco mode driving strategy is performed when the slope detected by the vehicle is less than or equal to the maximum slope such as 15%. When the slope detected by the vehicle is larger than the maximum slope such as 15%, in order to satisfy the grade ability of the hybrid electrical vehicle, it is ruled that the engine must start at this time, and the torque upper limit of the engine, the torque lower limit curve of the engine and the output power limit of the electric motor are cancelled, and the original driving strategy is not performed until the slope detected by the vehicle is less than the minimum slope such as 5%.

Figure 10:
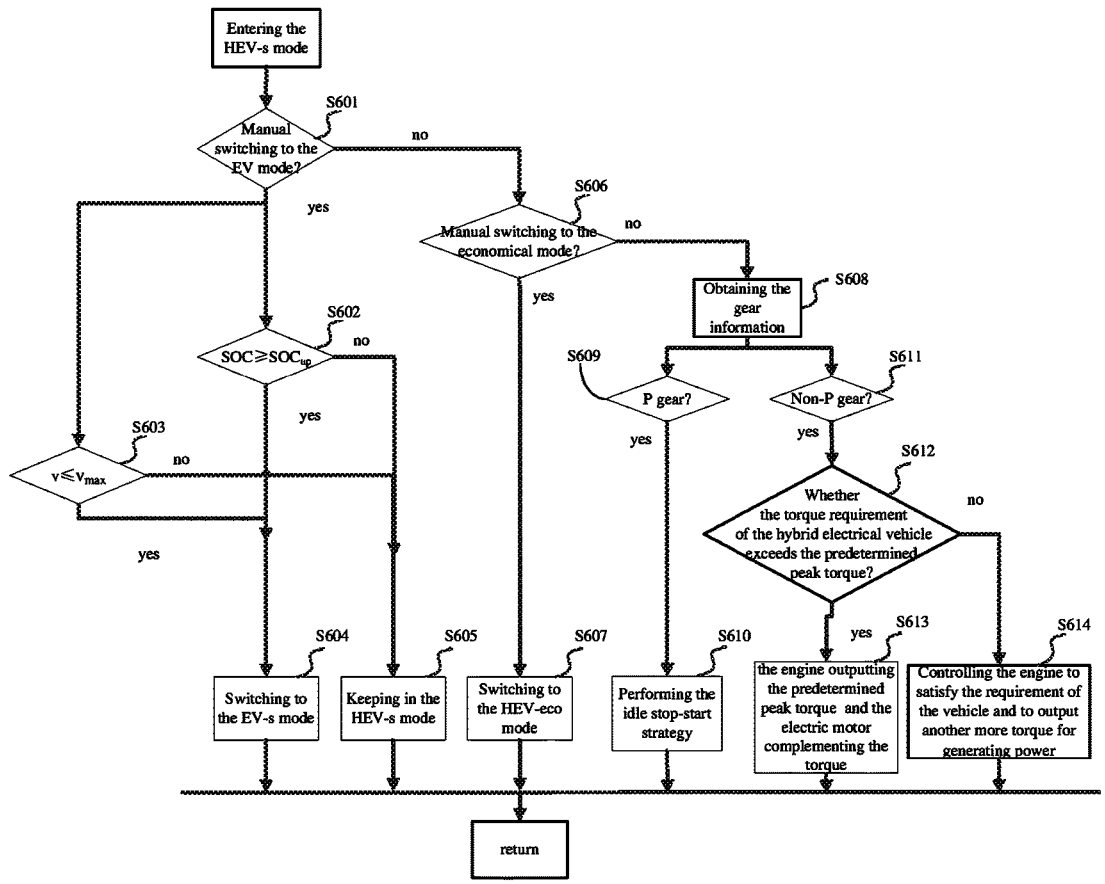
FIG. 10 is a flow chart of a method for controlling a hybrid electrical vehicle in a hybrid electrical-sport mode according to an embodiment of the present disclosure.

In still yet another embodiment of the present disclosure, as shown in FIG. 10, when the hybrid electrical vehicle is in the hybrid electrical-sport mode and the control module receives a mode switching instruction to switch to the electrical-sport mode, the control module controls the hybrid electrical vehicle to switch to the electrical-sport mode if the current electric quantity of the power battery is larger than or equal to the second electric quantity threshold such as 30%, or the current speed of the hybrid electrical vehicle is less than the first speed threshold such as 150 km/h.

Moreover, when the hybrid electrical vehicle works in the hybrid electrical-sport mode and is in the P gear, the control module controls the hybrid electrical vehicle to enter the idle stop-start mode. When the hybrid electrical vehicle works in the hybrid electrical-sport mode and is in a non-P gear, the control module controls the engine to output a predetermined peak torque of the engine and controls the electric motor to complement the torque if the torque requirement of the hybrid electrical vehicle exceeds the predetermined peak torque; and the control module controls the engine to output a torque satisfying the torque requirement of the hybrid electrical vehicle and controls the electric motor to generate power if the torque requirement of the hybrid electrical vehicle is less than or equal to the predetermined peak torque of the engine.

In other words, in the embodiment of the present disclosure as shown in FIG. 10, for the hybrid electrical vehicle driving in the HEV-s mode, when the EV mode selecting button is pressed manually, only if the current electric quantity of the power battery is larger than or equal to the second electric quantity threshold such as 30%, or the current speed of the electrical vehicle is less than or equal to the first speed threshold such as 150 km/h, can the hybrid electrical vehicle be switched to the EV-s mode, otherwise no mode switching is performed; when the operating mode knob is rotated to the economical mode, the hybrid electrical vehicle is switched to the HEV-eco mode; when there is no manual input to the mode selecting buttons, the hybrid electrical vehicle is kept in the HEV-s mode. The HEV-s mode is similar to the low power manner in the HEV-eco mode, the pure electric mode at a low speed is cancelled and the engine stop-start function with engaging the P gear is added. Furthermore, the output power of the electric motor is not limited, and the torque upper limit and the torque lower limit of the engine are also cancelled, such that the engine and the electric motor can output the peak values, thus obtaining the best power performance in the HEV-s mode.

In embodiments of the present disclosure, when the engine starts to operate, the double-clutch gearbox transmits the power from the engine and performs the gear shift. When the hybrid electrical vehicle is in the HEV-eco mode or in the HEV-s mode, two gear shift strategies are used respectively. The HEV-eco mode focuses on reducing the oil wear, and a principle of the gear shift strategy thereof is to ensure the engine works in efficient regions as far as possible, and thus a shift point of each gear may be a little earlier and the engine mainly works in a rotating speed region of 1500-2000 rpm during driving. The HEV-s mode focuses on the power performance, and a principle of the gear shift strategy thereof is to ensure the torque transmitted to the wheels from the engine is as large as possible so as to obtain better driving performance, and thus the shift point of each gear may be a little later. Furthermore, with respect to the rapid acceleration with a full throttle, the shift point is defined as a maximum torque point of the engine calibrated under each gear, thus extremely improving the acceleration performance.

In an embodiment of the present disclosure, when the hybrid electrical vehicle is in the electrical-economical mode, the maximum output power of the power battery is less than a first predetermined power; when the hybrid electrical vehicle works in the electrical-sport mode, the maximum output power of the power battery is less than a second predetermined power, in which the second predetermined power is greater than the first predetermined power; when the hybrid electrical vehicle works in the hybrid electrical-economical mode, each of the maximum output power of the power battery and the maximum output power of the engine is less than the first predetermined power, and a maximum output torque of the engine is less than a first torque threshold; when the hybrid electrical vehicle works in the hybrid electrical-sport mode, the maximum output power of the power battery is less than the second predetermined power, and the control module allows the engine to output the maximum output torque and the maximum output power. In an embodiment of the present disclosure, the first predetermined power is 70 KW, the second predetermined power is 110 KW and the first torque threshold is 185 N·M.

In other words, in the electrical-economical mode, the hybrid electrical vehicle consumes the electric power purely, the maximum output power of the power battery is less than a maximum output power (such as 70 KW) in the economical mode and the power battery works in the most economical regions; in the electrical-sport mode, the hybrid electrical vehicle consumes the electric power purely, the maximum output power of the power battery is less than the maximum output power (such as 110 KW) in the sport mode; in the hybrid electrical-economical mode, the hybrid electrical vehicle consumes both the electric power and the thermal power, the maximum output power of the engine is less than the maximum output power (such as 70 KW) in the economical mode, and the maximum output torque of the engine is less than a maximum output torque (such as 185 N·M) in the economical mode, such that the engine and the electric motor work in the most economical regions; in the hybrid electrical-sport mode, the hybrid electrical vehicle consumes both the electric power and the thermal power, the maximum output power of the power battery is less than the maximum output power such as 110 KW in the sport mode, and the control module allows the engine to output the maximum output torque and the maximum output power.

It should be noted that, in embodiments of the present disclosure, the most economical region in the pure electric mode refers to the region in which the power battery works with a relatively lower discharging power preferentially on the premise of satisfying the power performance (operating performance and acceleration performance) of the vehicle, this is because the working efficiency of the power battery reduces with the increment of the discharging power of the power battery. The most economical region in the hybrid mode refers to the region in which the power battery works with a relatively lower discharging power preferentially on the premise of satisfying the power performance (operating performance and acceleration performance) of the vehicle, this is because the working efficiency of the power battery reduces with the increment of the discharging power of the power battery. The most economical region of the engine is determined by the torque and rotating speed of engine. As shown in FIG. 7, a horizontal ordinate represents the rotating speed of the engine and a longitudinal coordinate represents the torque of the engine, and the most economical region of the engine can be obtained by matching an appropriate rotating speed with a certain torque. In other words, if the torque of the engine is too large, the torque of the engine can be reduced and the rest torque is complemented by the electric motor; if the torque of the engine is too small, the torque of the engine can be increased, but it does not need the increased torque to drive the vehicle, and thus energy generated by the increased torque is recovered to be used for power generation of the electric motor.

Further, the maximum output power in the economical mode can be understood as a maximum output power for keeping the power battery or the engine working in the most economical regions. The maximum output power in the sport mode is a unique property, in which the engine outputs the maximum torque or the maximum power, and the power battery outputs the maximum power, and thus the power system provides the maximum output torque or the maximum output power for the vehicle.

In addition, it can be understood that the working mode when the hybrid electrical vehicle starts is still the working mode when the hybrid electrical vehicle is stalled at last time. Moreover, the hybrid electrical vehicle also has a pure fuel mode which is a fault mode.

With the hybrid electrical vehicle according to embodiments of the present disclosure, the engine and the electric motor are connected in a parallel, which can effectively improve an energy utilization factor as compared with a series connection structure adopted in a power system of the conventional hybrid electrical vehicle. Moreover, the parallel connection is simple in structure and can avoid a complex ECVT match in a series-parallel connection, which reduces a risk of riding uncomfortably caused by the match failure, and thus the economy of the hybrid electrical vehicle is greatly improved on the premise of ensuring the power performance of the hybrid electrical vehicle. In addition, the switching between a plurality of working modes provides the driver with a high operability, thus improving driving fun.

In the following, a method for controlling the hybrid electrical vehicle is described in detail with reference to FIGS. 3-11, in which the hybrid electrical vehicle is the hybrid electrical vehicle described in above embodiments of the present disclosure.

Figure 11:
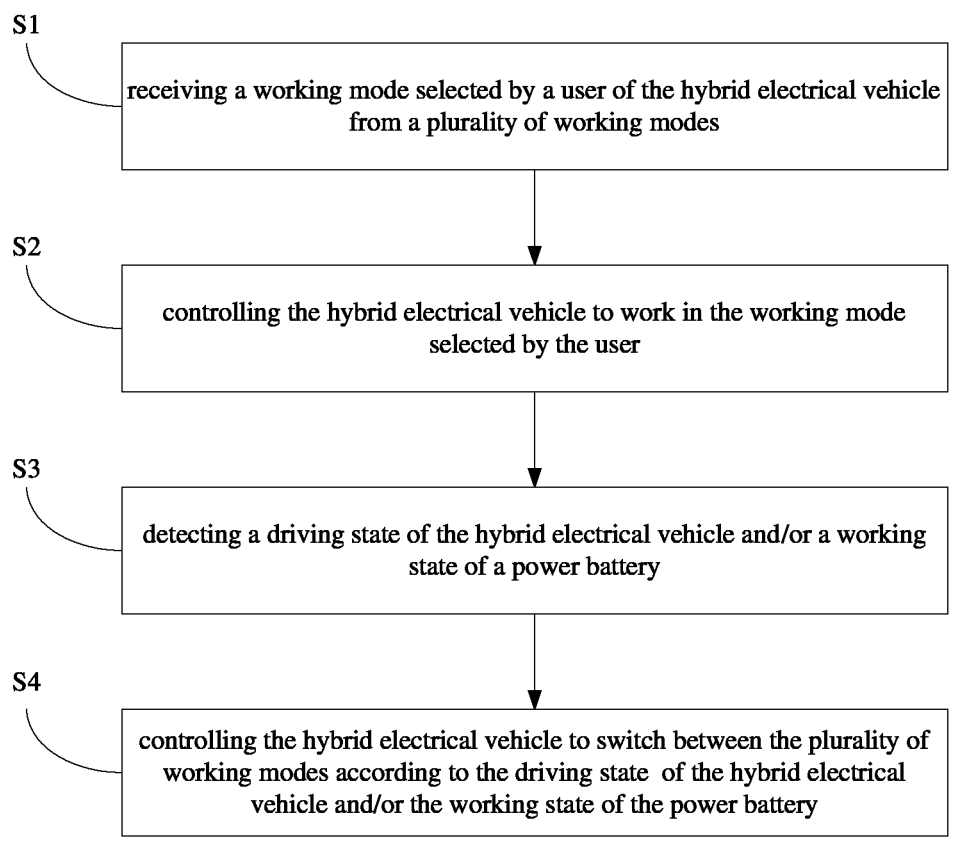
FIG. 11 is a flow chart of a method for controlling a hybrid electrical vehicle according to an embodiment of the present disclosure.

FIG. 11 is a flow chart of a method for controlling a hybrid electrical vehicle according to an embodiment of the present disclosure. As shown in FIG. 11, the method for controlling the hybrid electrical vehicle includes following steps.

At step S1, a working mode selected by a user of the hybrid electrical vehicle from a plurality of working modes is received. The plurality of working modes include an electrical-economical mode, an electrical-sport mode, a hybrid electrical-economical mode and a hybrid electrical-sport mode At step S2, the hybrid electrical vehicle is controlled to work in the working mode selected by the user.

At step S3, a driving state of the hybrid electrical vehicle and/or a working state of a power battery are detected.

At step S4, the hybrid electrical vehicle is controlled to switch between the plurality of working modes according to driving state of the hybrid electrical vehicle and/or the working state of the power battery.

In an embodiment of the present disclosure, as shown in FIG. 3, a method for controlling the hybrid electrical vehicle in an electrical-economical includes following steps.

At step S101, manual switching information is obtained, in which the manual switching information may be about whether a HEV mode selecting button switching operation is performed, whether a Sport mode selecting button switching operation is performed or whether no mode selecting button switching operation is performed. In other words, it is determined whether a manual switch is performed, if yes, execute step S102; and if no, execute step S103.

At step S102, a working mode switching is performed and a corresponding control strategy of a power system is performed. In other words, when the hybrid electrical vehicle is in the electrical-economical mode and a mode switching instruction is received from a user, the control module controls the hybrid electrical vehicle to switch to a working mode corresponding to the mode switching instruction from the user.

At step S103, the working mode is not switched, and then a current electric quantity (state of charge, SOC) of the power battery, a maximum allowable discharge power Pb of the power battery and a slope i detected by the hybrid electrical vehicle are compared with predetermined thresholds (i.e., the lower threshold of the electric quantity $SOC_{down}$ (such as 20%), the lower threshold of the maximum allowable discharge power $Pb_{down}$ (such as 12 KW), and the upper threshold of the slope $i_{up}$ (such as 15%)) respectively to determine whether $SOC \leqslant SOC_{down}$, whether $Pb \leqslant Pb_{down}$ and whether $i_{up} \leqslant i$.

At step S104, if at least one of the above three conditions is satisfied, the hybrid electrical vehicle is witched to the HEV-eco mode automatically. In other words, if the current electric quantity of the power battery is less than or equal to the first electric quantity threshold such as 20%, or the maximum allowable discharge power of the power battery is less than or equal to the first power threshold such as 12 KW, or the slope detected by the hybrid electrical vehicle is greater than or equal to a maximum slope such as 15%, the control module controls the hybrid electrical vehicle to switch to the hybrid electrical-economical mode.

At step S105, if each of the above three conditions is not satisfied, the hybrid electrical vehicle is not switched to the HEV-eco mode and is kept driving in the EV-eco mode.

When the hybrid electrical vehicle is driven in the EV-eco mode and no manual or automatic mode switching is performed, the electric motor drives the hybrid electrical vehicle continuously as a single power source. The EV-eco mode focuses on saving electric power on the premise of satisfying a power performance requirement of the hybrid electrical vehicle, and also focuses on improving the electricity efficiency by avoiding the long term and high power consumption, and thus the maximum output power of the electric motor is limited to a certain value such as 70 KW. Furthermore, in order to satisfy the grade ability of the hybrid electrical vehicle, the maximum output torque of the electric motor is not limited, i.e., when the hybrid electrical vehicle is in the EV-eco mode, the control module controls the hybrid electrical vehicle to drive with a limited power.

With the method for controlling the hybrid electrical vehicle in the EV-eco mode, by determining the current electric quantity of the power battery, the maximum allowable discharge power of the power battery and the slope detected by the hybrid electrical vehicle to control the vehicle to switch to the HEV-eco mode automatically, normal driving of the hybrid electrical vehicle can be ensured and risks of reducing the power performance can be avoided. In conclusion, with the method for controlling the hybrid electrical vehicle in the EV-eco mode, on the premise of satisfying the power performance of the whole vehicle, the power battery keeps working in high efficient regions, thus realizing a long driving mileage, a low operation cost and a low emission.

In another embodiment of the present disclosure, as shown in FIG. 4, a method for controlling the hybrid electrical vehicle in the electrical-sport mode includes following steps.

At step S201, manual switching information is obtained, in which the manual switching information may be about whether a HEV mode selecting button switching operation is performed, whether an economical mode selecting button switching operation is performed or whether no mode selecting button switching operation is performed. In other words, it is determined whether a manual switch is performed, if yes, execute step S202; and if no, execute step S103.

At step S202, a working mode switching is performed and a corresponding control strategy of the power system is performed. In other words, when the hybrid electrical vehicle is in the electrical-sport mode and a mode switching instruction is received from the user, the control module controls the hybrid electrical vehicle to switch to a working mode corresponding to the mode switching instruction from the user.

At step S203, the working mode is not switched, and then the current electric quantity (state of charge, SOC) of the power battery, the maximum allowable discharge power Pb of the power battery and a slope i detected by the hybrid electrical vehicle are compared with predetermined thresholds (i.e., the lower threshold of the electric quantity $SOC_{down}$ (such as 20%), the lower threshold of the maximum allowable discharge power $Pb_{down}$ (such as 12 KW), and the upper threshold of the slope $i_{up}$ (such as 15%)) respectively to determine whether $SOC \leqslant SOC_{down}$, whether $Pb \leqslant Pb_{down}$ and whether $i_{up} \leqslant i$.

At step S204, if at least one of the above three conditions is satisfied, the hybrid electrical vehicle is witched to the HEV-s mode automatically. In other words, if the current electric quantity of the power battery is less than or equal to the first electric quantity threshold such as 20%, or the maximum allowable discharge power of the power battery is less than or equal to the first power threshold such as 12 KW, or the slope detected by the hybrid electrical vehicle is greater than or equal to the maximum slope such as 15%, the control module controls the hybrid electrical vehicle to switch to the hybrid electrical-economical mode.

At step S205, if each of the above three conditions is not satisfied, the hybrid electrical vehicle is not switched to the HEV-s mode and is kept driving in the EV-s mode.

When the hybrid electrical vehicle is driven in the EV-s mode and no manual or automatic mode switching is performed, the electric motor drives the hybrid electrical vehicle continuously as the single power source. In the EV-s mode, the maximum output torque and the maximum output power of the electric motor are not limited, and thus the electric motor drives the vehicle with the maximum capacity, and a higher power performance requirement (such as overtaking acceleration and fast climbing) can be achieved in the EV mode.

With the method for controlling the hybrid electrical vehicle in the EV-s mode, by determining the current electric quantity of the power battery, the maximum allowable discharge power of the power battery and the slope detected by the hybrid electrical vehicle to control the vehicle to switch to the HEV-s mode automatically, normal driving of the hybrid electrical vehicle can be ensured and risks of reducing the power performance can be avoided. In conclusion, with the method for controlling the hybrid electrical vehicle in the EV-s mode, the vehicle can be driven in the pure electric mode and a better power performance can be achieved, and the working mode is flexible and changeable, thus providing the user with more driving fun.

In yet another embodiment of the present disclosure, as shown in FIG. 5, a method for controlling the hybrid electrical vehicle in the hybrid electrical-economical mode includes following steps.

At step S301, switching information about the EV mode selecting button is obtained, and it is determined whether a manual switching to the EV mode is performed, if yes, execute step S302 or step S303; and if no, execute step S306.

At step S302, the current electric quantity (state of charge, SOC) of the power battery is compared with the predetermined upper electric quantity threshold $SOC_{up}$ such as 30% to determine whether $SOC_{up} \lessapprox SOC$, if yes, execute step S304; and if no, execute step S305.

At step S303, the current speed of the hybrid electrical vehicle is compared with the maximum speed threshold $V_{max}$ (i.e., a highest speed which allows the hybrid electric vehicle to switch to the EV mode from the HEV mode, such as 150 km/h) to determine whether $v \lessapprox V_{max}$, if yes, execute step 304; and if no, execute step S305.

At step S304, the hybrid electrical vehicle is controlled to switch to the EV-eco mode and a corresponding control strategy of the power system is performed.

In other words, when the hybrid electrical vehicle is in the hybrid electrical-economical mode and the control module receives the mode switching instruction to switch to the electrical-economical mode, the control module controls the hybrid electrical vehicle to switch to the electrical-economical mode if the current electric quantity of the power battery is larger than or equal to the second electric quantity threshold such as 30%, or the current speed of the hybrid electrical vehicle is less than or equal to the first speed threshold such as 150 km/h.

At step S305, the hybrid electrical vehicle keeps driving in the HEV-eco mode.

At step S306, switching information about the Sport mode selecting button is obtained, and it is determined whether a manual switching to the sport mode is performed, if yes, execute step S307; and if no, execute step S308.

At step S307, the hybrid electrical vehicle is controlled to switch to the HEV-s mode and a corresponding control strategy of the power system is performed.

At step S308, the working mode is not switched, and then slope information is obtained, i.e., the slope i is detected.

At step S309, it is determined whether $i \lessapprox i_{down}$, if yes, execute step S310, and if no, execute step S317.

At step S310, the current electric quantity (state of charge, SOC) of the power battery and the maximum allowable discharge power Pb of the power battery are detected, and are compared with the thresholds (i.e., the upper electric quantity threshold $SOC_{up}$ (such as 30%), the lower electric quantity threshold $SOC_{down}$ (such as 20%), the upper threshold of the maximum allowable discharge power $Pb_{up}$ (such as 30 KW), the lower threshold of the maximum allowable discharge power $Pb_{down}$ (such as 12 KW)) respectively.

At step S311, it is determined whether $SOC_{up} \lessapprox SOC$ and whether $Pb_{up} \lessapprox Pb$, if yes, execute step S312.

At step S312, the hybrid electrical vehicle is controlled in the economical manner.

In other words, when the hybrid electrical vehicle is in the hybrid electrical-economical mode, the control module controls the hybrid electrical vehicle to work in the economical manner if the slope detected by the hybrid electrical vehicle is less than or equal to the minimum slope such as 5%, and the current electric quantity of the power battery is larger than or equal to the second electric quantity threshold such as 30% and the maximum allowable discharge power of the power battery is larger than or equal to the second power threshold such as 30 KW.

At step S313, it is determined whether $SOC_{up} > SOC > SOC_{down}$ and $Pb_{up} \lessapprox Pb$, or whether $SOC_{up} \lessapprox SOC$ and $Pb_{up} > Pb > Pb_{down}$, if yes, execute step S314.

At step S314, the hybrid electrical vehicle is controlled in the original manner, i.e., if the original manner is the economical manner, the hybrid electrical vehicle still works in the economical manner; if the original manner is the low power manner, the hybrid electrical vehicle still works in the low power manner.

At step S315, it is determined whether $SOC \lessapprox SOC_{down}$ or whether $Pb \lessapprox Pb_{down}$, if yes, execute step S316.

At step S316, the hybrid electrical vehicle is controlled in the low power manner.

In other words, when the hybrid electrical vehicle is in the hybrid electrical-economical mode, the control module controls the hybrid electrical vehicle to work in the economical manner if the slope detected by the hybrid electrical vehicle is less than or equal to the minimum slope such as 5% and the current electric quantity of the power battery is less than or equal to the first electric quantity threshold such as 20%, or if the current slope detected by the hybrid electrical vehicle is less than or equal to the minimum slope such as 5% and the maximum allowable discharge power of the power battery is less than or equal to the first power threshold such as 12 KW, in which the second electric quantity threshold is larger than the first electric quantity threshold, and the second power threshold is larger than the first power threshold.

At step S317, it is determined whether $i_{up} > i > i_{down}$, and if yes, execute step S318.

At step S318, the hybrid electrical vehicle is controlled in the original manner.

At step S319, it is determined whether $i_{up} \lessapprox i$, and if yes, execute step S320.

At step 320, the hybrid electrical vehicle is controlled to work in the economical manner, moreover, the pure electric mode at a low speed, the upper limit of the engine, and the upper limit of the electric motor are cancelled.

It should be noted that, in embodiments of the present disclosure, in the low power manner, the engine drives the electric motor to generate power quickly so as to get rid of a low power state, such that the electric motor again has the ability of adjusting the working region of the engine, thus ensuring the economy of the hybrid electrical vehicle.

In the embodiment of the present disclosure as shown in FIG. 6, a method for controlling the hybrid electrical vehicle in the economical manner includes following steps.

At step S401, the current speed of the hybrid electrical vehicle is obtained and the current speed v of the hybrid electrical vehicle is compared with the second speed threshold such as 15 km/h and the third speed threshold such as 30 km/h.

At step S402, it is determined whether $v_{up} \lesssim v$, and if yes, execute step S403.

At step S403, it is determined whether the torque requirement of the hybrid electrical vehicle exceeds the predetermined torque upper limit curve of the engine as shown in FIG. 7, and if yes, execute step S404.

At step S404, it is determined whether a fault occurs in the power system of the hybrid electrical vehicle, if yes, execute step S406; and if no, execute step S405.

At step S405, the engine is controlled to output a torque with the predetermined torque upper limit curve and the electric motor is controlled to complement the torque. In other words, when the hybrid electrical vehicle works in the economical manner and the current speed of the hybrid electrical vehicle is larger than or equal to the third speed threshold such as 30 km/h, the control module controls the engine to output a torque with the predetermined torque upper limit curve and controls the electric motor to complement the torque if a torque requirement of the hybrid electrical vehicle exceeds the predetermined torque upper limit curve of the engine.

At step S406, the fault is processed.

At step S407, it is determined whether the torque requirement of the hybrid electrical vehicle is below the predetermined torque lower limit curve of the engine as shown in FIG. 7, and if yes, execute step S408.

At step S408, it is determined whether a fault occurs in the power system of the hybrid electrical vehicle, if yes, execute step S410; and if no, execute step S409.

At step S409, the engine is controlled to output a torque with the predetermined torque lower limit curve and the electric motor is controlled to generate power. In other words, when the hybrid electrical vehicle works in the economical manner and the current speed of the hybrid electrical vehicle is larger than or equal to the third speed threshold such as 30 km/h, the control module controls the engine to output a torque with the predetermined torque lower limit curve and controls the electric motor to generate power if the torque requirement of the hybrid electrical vehicle is below the predetermined torque lower limit curve of the engine.

At step S410, the fault is processed.

At step S411, it is determined whether the torque requirement of the hybrid electrical vehicle exceeds the predetermined torque lower limit curve of the engine and is below the predetermined torque upper limit curve of the engine as shown in FIG. 7, and if yes, execute step S412.

At step S412, it is determined whether a fault occurs in the power system of the hybrid electrical vehicle, if yes, execute step S414; and if no, execute step S413.

At step S413, the engine is controlled to satisfy the torque requirement of the hybrid electrical vehicle preferentially, and also controlled to output another more torque for generating power. In other words, when the hybrid electrical vehicle works in the economical manner and the current speed of the hybrid electrical vehicle is larger than or equal to the third speed threshold such as 30 km/h, the control module controls the engine to output the torque satisfying the torque requirement of the hybrid electrical vehicle and controls the electric motor to generate power if the torque requirement of the hybrid electrical vehicle exceeds the predetermined torque lower limit curve of the engine and is below the predetermined torque upper limit curve of the engine. A principle of generating power follows the functional relationship between the generation power and SOC of the power battery as shown in FIG. 8, and following two conditions should be satisfied simultaneously: (1) a generating torque converted to the electric motor is not larger than $Tm_{max}$; (2) a total output torque of the engine does not exceed the predetermined torque upper limit curve as shown in FIG. 7. If the torque of the engine calculated from a generation power curve does not satisfy any of the above two conditions, the above two conditions are used as upper limits to constraint the torque of the engine configured to generate power.

At step S414, the fault is processed.

At step S415, it is determined whether $v_{up} > v > v_{down}$, and if yes, execute step S416.

At step S416, it is determined whether a fault occurs in the power system of the hybrid electrical vehicle, if yes, execute step S418; and if no, execute step S417.

At step S417, the hybrid electrical vehicle is controlled to work in the original manner, i.e., the hybrid electrical vehicle is still driven by the electric motor only, or the electric motor still assists the engine to drive the hybrid electrical vehicle.

At step S418, the fault is processed.

At step S419, it is determined whether $v \lesssim v_{down}$, and if yes, execute step S420.

At step S420, it is determined whether a fault occurs in the power system, if yes, execute step S422; and if no, execute step S421.

At step S421, the hybrid electrical vehicle is driven by the electric motor only and the engine is stalled. In other words, when the hybrid electrical vehicle works in the economical manner and the speed of the hybrid electrical vehicle is less than or equal to the second speed threshold such as 15 km/h, the control module controls the hybrid electrical vehicle to switch to the pure electric mode.

At step S422, the fault is processed.

In the embodiment of the present disclosure as shown in FIG. 9, a method for controlling the hybrid electrical vehicle in the low power manner includes following steps.

At step S501, gear information is obtained.

At step S502, it is determined whether the hybrid electrical vehicle is in a non-P gear, and if yes, execute step S503 or step S507 or step S511.

At step 503, it is determined whether the torque requirement of the hybrid electrical vehicle exceeds the predetermined torque upper limit curve of the engine as shown in FIG. 7, and if yes, execute step S504.

At step S504, it is determined whether a fault occurs in the power system of the hybrid electrical vehicle, if yes, execute step S506; and if no, execute step S505.

At step S505, the engine is controlled to output a torque with the predetermined torque upper limit curve and the electric motor is controlled to complement the torque. In other words, when the hybrid electrical vehicle works in the low power manner and is in a non-P gear, the control module controls the engine to output a torque with the predetermined torque upper limit curve and controls the electric motor to complement the torque if a torque requirement of the hybrid electrical vehicle exceeds the predetermined torque upper limit curve of the engine.

At step S506, the fault is processed.

At step S507, it is determined whether the torque requirement of the hybrid electrical vehicle is below the predetermined torque lower limit curve of the engine as shown in FIG. 7, and if yes, execute step S508.

At step S508, it is determined whether a fault occurs in the power system of the hybrid electrical vehicle, if yes, execute step S510; and if no, execute step S509.

At step S509, the engine is controlled to output a torque with the predetermined torque lower limit curve and the electric motor is controlled to generate power. In other words, when the hybrid electrical vehicle works in the low power manner and is in the non-P gear, the control module controls the engine to output a torque with the predetermined torque lower limit curve and controls the electric motor to generate power if the torque requirement of the hybrid electrical vehicle is below the predetermined torque lower limit curve of the engine.

At step S510, the fault is processed.

At step S511, it is determined whether the torque requirement of the hybrid electrical vehicle exceeds the predetermined torque lower limit curve of the engine and is below the predetermined torque upper limit curve of the engine, and if yes, execute step S512.

At step S512, it is determined whether a fault occurs in the power system, if yes, execute step S514; and if no, execute step S513.

At step S513, the engine is controlled to satisfy the torque requirement of the hybrid electrical vehicle preferentially, and also controlled to output another more torque for generating power. In other words, when the hybrid electrical vehicle works in the low power manner and is in the non-P gear, the control module controls the engine to output the torque satisfying the torque requirement of the hybrid electrical vehicle and controls the electric motor to generate power if the torque requirement of the hybrid electrical vehicle exceeds the predetermined torque lower limit curve of the engine and is below the predetermined torque upper limit curve of the engine. The principle of generating power follows the functional relationship between the generation power and SOC of the power battery as shown in FIG. 8, and following two conditions should be satisfied simultaneously: (1) the generating torque converted to the electric motor is not larger than $Tm_{max}$; (2) the total output torque of the engine does not exceed the predetermined torque upper limit curve as shown in FIG. 7. If the torque of the engine calculated from the generation power curve does not satisfy any of the above two conditions, the above two conditions are used as upper limits to constraint the torque of the engine configured to generate power.

At step S514, the fault is processed.

At step S515, it is determined whether the hybrid electrical vehicle is in the P gear, and if yes, execute step S516.

At step S516, an idle stop-start strategy is performed. In other words, when the hybrid electrical vehicle works in the low power manner and is in the P gear, the control module controls the hybrid electrical vehicle to enter an idle stop-start mode, and the engine is stalled.

When the hybrid electrical vehicle is driven in the HEV-eco mode, the electric motor cooperates with the engine to improve the energy utilization factor, and general procedures are shown as follows. When the hybrid electrical vehicle works in the non-economical regions of the engine, the electric motor is used more often than the engine; when the hybrid electrical vehicle works in the economical regions of the engine, the engine can generate some power to charge the power battery, and the less the electric quantity of the power battery is, the higher the generation power of the engine is. Moreover, in this mode, the maximum output power of the electric motor is limited so as to avoid a long term high power consumption, such that the electric quantity of the power battery is kept in a relatively high level and the electric motor always has electric energy to adjust the engine to work in high efficiency regions, thus reducing the oil wear during the hybrid electrical driving as much as possible and ensuring the economy and emission behavior of the hybrid electrical vehicle. When the hybrid electrical vehicle requires heavy load output, the electric motor can assist the engine to drive the vehicle together, and thus the power performance is greatly improved as compared with that in the EV mode. When the user needs a long distance driving and wants to reduce the oil wear as much as possible, he can choose the above mode.

In an embodiment of the present disclosure as shown in FIG. 10, a method for controlling the hybrid electrical vehicle in the hybrid electrical-sport mode includes following steps.

At step S601, switching information about the EV mode selecting button is obtained and it is determined whether a manual switch to the EV mode is performed, if yes, execute step S602 or step S603; and if no, execute step S606.

At step S602, the current electric quantity SOC of the power battery is compared with the second electric quantity threshold such as 30% and it is determined whether $SOC_{up} \leq SOC$, if yes, execute step S604; and if no, execute step S605.

At step S603, the current speed of the hybrid electrical vehicle is compared with the first speed threshold $V_{max}$ (i.e., the highest speed that allows the hybrid electric vehicle to switch to the EV mode from the HEV mode, such as 150 km/h), and it is determined whether $v \leq V_{max}$, if yes, execute step 604; and if no, execute step S605.

At step S604, the hybrid electrical vehicle is controlled to switch to the EV-s mode and a corresponding control strategy of the power system is performed.

In other words, when the hybrid electrical vehicle is in the hybrid electrical-sport mode and the mode switching instruction to switch to the electrical-sport mode is received, the control module controls the hybrid electrical vehicle to switch to the electrical-sport mode if the current electric quantity of the power battery is larger than or equal to the second electric quantity threshold such as 30%, or the current speed of the hybrid electrical vehicle is less than or equal to the first speed threshold such as 150 km/h.

At step S605, the hybrid electrical vehicle keeps driving in the HEV-s mode.

At step S606, switching information about the economical mode selecting button is obtained, and it is determined whether a manual switch to the economical mode is performed, if yes, execute step S607; and if no, execute step S608.

At step S607, the hybrid electrical vehicle is controlled to switch to the HEV-eco mode and a corresponding control strategy of the power system is performed.

At step S608, the working mode is not switched, and the gear information is obtained to determine the current gear of the hybrid electrical vehicle.

At step S609, it is determined whether the hybrid electrical vehicle is in the P gear, and if yes, execute step S610.

At step S610, the idle stop-start strategy is performed. In other words, when the hybrid electrical vehicle works in the hybrid electrical-sport mode and is in the P gear, the control module controls the hybrid electrical vehicle to enter the idle stop-start mode.

At step S611, it is determined whether the hybrid electrical vehicle is in the non-P gear, and if yes, execute step S312.

At step S612, the torque requirement of the hybrid electrical vehicle is compared with a predetermined peak torque of the engine and it is determined whether the torque requirement of the hybrid electrical vehicle exceeds the predetermined peak torque, if yes, execute step S613; and if no, execute step S614.

At step S613, the engine is controlled to output the predetermined peak torque and the electric motor is controlled to complement the torque. When the electric motor is limited by the current capability of itself or of the power battery, it drives with the maximum capabilities of itself and the power battery. In other words, when the hybrid electrical vehicle is in the hybrid electrical-sport mode and is in the non-P gear, the control module controls the engine to output the predetermined peak torque of the engine and controls the electric motor to complement the torque if the torque requirement of the hybrid electrical vehicle exceeds the predetermined peak torque of the engine.

At step S614, the engine is controlled to satisfy the torque requirement of the hybrid electrical vehicle preferentially, and also controlled to output another more torque for generating power. In other words, when the hybrid electrical vehicle is in the hybrid electrical-sport mode and is in the non-P gear, the control module controls the engine to output a torque satisfying the torque requirement of the hybrid electrical vehicle and controls the electric motor to generate power if the torque requirement of the hybrid electrical vehicle is less than or equal to the predetermined peak torque of the engine. The principle of generating power follows the relationship between the generation power and SOC of the power battery as shown in FIG. 8, and following two conditions should be satisfied simultaneously: (1) the generating torque converted to the electric motor is not larger than $T_{max}$; (2) the total output torque of the engine does not exceed the predetermined torque upper limit curve as shown in FIG. 7. If the torque of the engine calculated from the generation power curve does not satisfy any of the above two conditions, the above two conditions are used as upper limits to constraint the torque of the engine configured to generate power.

When the hybrid electrical vehicle is driven in the HEV-s mode and is in the non-P gear, the engine is kept in a starting state. Only if the hybrid electrical vehicle is in the P gear and the idle stop-start conditions are satisfied, can the engine be stalled. In the HEV-s mode, the maximum output torque and the maximum output power of the engine and the electric motor are not limited any more, and thus a maximum driving capability of the power system can be achieved. Thus, the HEV-s mode realizes the best power performance among the four working modes. However, since the engine keeps working during the driving process of the hybrid electrical vehicle (either cooperating with the electric motor to drive the vehicle or driving the vehicle and driving the electric motor to generate power synchronously (when the electric quantity of the power battery is less than a certain threshold)), the oil wear is relatively high and the economy of the hybrid electrical vehicle cannot be ensured. The HEV-s mode is suitable for users who have a high requirement of the power performance, and has enough power equal to that of the fuel vehicle with a high emission.

In embodiments of the present disclosure, by providing the EV, HEV, economical and Sport mode selecting buttons, four different working modes (i.e., the EV-eco mode, the EV-s mode, the HEV-eco mode and the HEV-s mode) can be obtained, each of which has different power performance requirement and economy requirement and thus has different driving strategies. Moreover, the power system of the hybrid electrical vehicle adopts the parallel connection mode instead of the series connection mode or the series-parallel connection mode. In addition, in the driving strategies, a starting point of the engine is optimized, a speed threshold is increased, the slope detection is added and a determination about the demanded power is cancelled. In the economical manner of the HEV-eco mode, the engine is limited to work in the region between the predetermined torque upper limit curve and the predetermined torque lower limit curve, and the generation power is represented by a dynamic curve taking the SOC value of the power battery as its independent variable.

With the method according to embodiments of the present disclosure, by providing a plurality of working modes, a driving requirement of the user in different working conditions can be satisfied, i.e., not only pure electric consumption in a city working condition can be satisfied, but also power performance requirement in a suburban district working condition can be satisfied, and thus the hybrid electrical vehicle can be driven according to subjective operation intentions of the user and the driving fun is improved. The power system of the hybrid electrical vehicle adopts the parallel connection mode which can effectively improve the energy utilization factor as compared with the series connection mode. Moreover, the parallel connection is simple in structure and can avoid a complex ECVT match in the series-parallel connection, which reduces a risk of driving uncomfortably caused by the match failure. Furthermore, in the driving strategy, the starting point of the engine is optimized to avoid premature and frequent start of the engine, such that noise when the engine starts can be reduced effectively, a working life of a starting system can be improved and a risk of pulling down a low voltage frequently caused by frequent start can also be reduced, and thus other low voltage electrical equipments can be ensured to operate normally. The working region of the engine is also optimized so as to ensure that the engine keeps working in the high efficiency region, and the generation power is also optimized so as to ensure that there are high power equilibrium points during the driving of the vehicle, thus facilitating the hybrid electrical vehicle mostly being in the economical strategy and reducing the oil wear efficiently. Moreover, the method for controlling the hybrid electrical vehicle is simple and reliable and is easy to operate by users.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. This should be understood by those skilled in the art which embodiments of the present disclosure belong to.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment.

It is understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A hybrid electrical vehicle, comprising:
    a transmission device connected with wheels of the hybrid electrical vehicle;
    an engine and a gearbox, wherein the engine is connected with the transmission device via the gearbox;
    an electric motor and a gear reducer, wherein the electric motor is connected with the transmission device via the gear reducer;
    a power battery configured to supply power to the electric motor; and
    a control module configured to control the electric motor and the engine according to a working mode selected by a user from a plurality of working modes and to control the hybrid electrical vehicle to switch between the plurality of working modes according to a driving state of the hybrid electrical vehicle and/or a working state of the power battery, wherein the plurality of working modes comprise at least two of an electrical-economical mode, an electrical-sport mode, a hybrid electrical-economical mode and a hybrid electrical-sport mode,
        wherein when the hybrid electrical vehicle is in at least one of the electrical-economical mode and the electrical-sport mode, when the hybrid electrical vehicle is in the electrical-economical mode, a maximum output power of the power battery is less than a first predetermined power, or when the hybrid electrical vehicle is in the electrical-sport mode, the maximum output power of the power battery is less than a second predetermined power, wherein the second predetermined power is greater than the first predetermined power; and
        wherein when the hybrid electrical vehicle is in at least one of the hybrid electrical-economical mode and the hybrid electrical-sport mode, when the hybrid electrical vehicle is in the hybrid electrical-economical mode, each of the maximum output power of the power battery and a maximum output power of the engine is less than the first predetermined power, and a maximum output torque of the engine is less than a first torque threshold, or when the hybrid electrical vehicle is in the hybrid electrical-sport mode, the maximum output power of the power battery is less than the second predetermined power, and the control module allows the engine to output the maximum output torque and the maximum output power.

2. The hybrid electrical vehicle according to claim 1, wherein
    when the hybrid electrical vehicle is in the electrical-economical mode, a maximum output power of the power battery is less than a first predetermined power;
    when the hybrid electrical vehicle is in the electrical-sport mode, the maximum output power of the power battery is less than a second predetermined power, wherein the second predetermined power is greater than the first predetermined power;
    when the hybrid electrical vehicle is in the hybrid electrical-economical mode, each of the maximum output power of the power battery and a maximum output power of the engine is less than the first predetermined power, and a maximum output torque of the engine is less than a first torque threshold; and
    when the hybrid electrical vehicle is in the hybrid electrical-sport mode, the maximum output power of the power battery is less than the second predetermined power, and the control module allows the engine to output the maximum output torque and the maximum output power.

3. The hybrid electrical vehicle according to claim 1, wherein the control module is configured to control the hybrid electrical vehicle to switch to the hybrid electrical-economical mode from the electrical-economical mode if a current electric quantity of the power battery is less than or equal to a first electric quantity threshold, or a maximum allowable discharge power of the power battery is less than or equal to a first power threshold, or a slope detected by the hybrid electrical vehicle is greater than or equal to a maximum slope.

4. The hybrid electrical vehicle according to claim 1, wherein the control module is configured to control the hybrid electrical vehicle to switch to the hybrid electrical-sport mode from the electrical-sport mode if a current electric quantity of the power battery is less than or equal to a first electric quantity threshold, or a maximum allowable discharge power of the power battery is less than or equal to a first power threshold, or a slope detected by the hybrid electrical vehicle is greater than or equal to a maximum slope.

5. The hybrid electrical vehicle according to claim 1, wherein the control module is configured to control the hybrid electrical vehicle to drive with a limited power if the hybrid electrical vehicle is in the electrical-economical mode.

6. The hybrid electrical vehicle according to claim 1, wherein if the hybrid electrical vehicle is in the electrical-economical mode or the electrical-sport mode and a mode switching instruction is received, the control module is configured to control the hybrid electrical vehicle to switch to the working mode corresponding to the mode switching instruction.

7. The hybrid electrical vehicle according to claim 1, wherein if the hybrid electrical vehicle is in the hybrid electrical-economical mode and the control module receives a mode switching instruction to switch to the electrical-economical mode, the control module is configured to control the hybrid electrical vehicle to switch to the electric-economical mode if a current electric quantity of the power battery is larger than or equal to a second electric quantity threshold, or a current speed of the hybrid electrical vehicle is less than or equal to a first speed threshold.

8. The hybrid electrical vehicle according to claim 1, wherein if the hybrid electrical vehicle is in the hybrid electrical-economical mode,
the control module is configured to control the hybrid electrical vehicle to operate in a first manner if a slope detected by the hybrid electrical vehicle is less than or equal to a minimum slope, a current electric quantity of the power battery is larger than or equal to the second electric quantity threshold, and a maximum allowable discharge power of the power battery is larger than or equal to a second power threshold; and
the control module is configured to control the hybrid electrical vehicle to operate in a second manner if the slope detected by the hybrid electrical vehicle is less than or equal to the minimum slope and the current electric quantity of the power battery is less than or equal to the first electric quantity threshold or if the current slope detected by the hybrid electrical vehicle is less than or equal to the minimum slope and the maximum allowable discharge power of the power battery is less than or equal to the first power threshold;
wherein the second electric quantity threshold is larger than the first electric quantity threshold, and the second power threshold is larger than the first power threshold.

9. The hybrid electrical vehicle according to claim 8, wherein if the hybrid electrical vehicle operates in the first manner and the speed of the hybrid electrical vehicle is less than or equal to a second speed threshold, the control module is configured to control the hybrid electrical vehicle to switch to the electrical-economical mode.

10. The hybrid electrical vehicle according to claim 8, wherein if the hybrid electrical vehicle operates in the first manner and the speed of the hybrid electrical vehicle is larger than a third speed threshold,
the control module is configured to control the engine to output a torque with a predetermined torque upper limit curve and to control the electric motor to complement the torque if a torque requirement of the hybrid electrical vehicle exceeds a predetermined torque upper limit curve of the engine;
the control module is configured to control the engine to output a torque with a predetermined torque lower limit curve and to control the electric motor to generate power if the torque requirement of the hybrid electrical vehicle is below a predetermined torque lower limit curve of the engine; and
the control module is configured to control the engine to output a torque satisfying the torque requirement of the hybrid electrical vehicle and to control the electric motor to generate power if the torque requirement of the hybrid electrical vehicle exceeds the predetermined torque lower limit curve of the engine and is below the predetermined torque upper limit curve of the engine.

11. The hybrid electrical vehicle according to claim 8, wherein if the hybrid electrical vehicle operates in the second manner and is in a non-P gear,
the control module is configured to control the engine to output a torque with a predetermined torque upper limit curve and to control the electric motor to complement the torque if a torque requirement of the hybrid electrical vehicle exceeds a predetermined torque upper limit curve of the engine;
the control module is configured to control the engine to output a torque with a predetermined torque lower limit curve and to control the electric motor to generate power if the torque requirement of the hybrid electrical vehicle is below the predetermined torque lower limit curve of the engine; and
the control module is configured to control the engine to output a torque satisfying the torque requirement of the hybrid electrical vehicle and to control the electric motor to generate power if the torque requirement of the hybrid electrical vehicle exceeds the predetermined torque lower limit curve of the engine and is below the predetermined torque upper limit curve of the engine.

12. The hybrid electrical vehicle according to claim 8, wherein if the hybrid electrical vehicle operates in the second manner and is in a P gear, the control module is configured to control the hybrid electrical vehicle to enter an idle stop-start mode.

13. The hybrid electrical vehicle according to claim 1, wherein if the hybrid electrical vehicle is in the hybrid electrical-sport mode and the control module receives a mode switching instruction to switch to the electrical-sport mode, the control module is configured to control the hybrid electrical vehicle to switch to the electrical-sport mode if a current electric quantity of the power battery is larger than or equal to a second electric quantity threshold or a current speed of the hybrid electrical vehicle is less than a first speed threshold.

14. The hybrid electrical vehicle according to claim 1, wherein if the hybrid electrical vehicle is in the hybrid electrical-sport mode and is in a P gear, the control module is configured to control the hybrid electrical vehicle to enter an idle stop-start mode.

15. The hybrid electrical vehicle according to claim 1, wherein if the hybrid electrical vehicle is in the hybrid electrical-sport mode and is in a non-P gear, the control module is configured to control the engine to output a predetermined peak torque of the engine and to control the electric motor to complement the torque if a torque requirement of the hybrid electrical vehicle exceeds the predetermined peak torque; and the control module is configured to control the engine to output a torque satisfying the torque requirement of the hybrid electrical vehicle and to control the electric motor to generate power if the torque requirement of the hybrid electrical vehicle is less than or equal to the predetermined peak torque of the engine.

16. A method for controlling a hybrid electrical vehicle, comprising steps of:

receiving a working mode selected by a user of the hybrid electrical vehicle from a plurality of working modes, wherein the plurality of working modes comprises at least two of an electrical-economical mode, an electrical-sport mode, a hybrid electrical-economical mode and a hybrid electrical-sport mode;

controlling the hybrid electrical vehicle to operate in the working mode selected by the user;

detecting a driving state of the hybrid electrical vehicle and/or a working state of a power battery; and controlling the hybrid electrical vehicle to switch between the plurality of working modes according to driving state of the hybrid electrical vehicle and/or the working state of the power battery, wherein when the hybrid electrical vehicle is in at least one of the electrical-economical mode and the electrical-sport mode, when the hybrid electrical vehicle is in the electrical-economical mode, a maximum output power of the power battery is less than a first predetermined power, or when the hybrid electrical vehicle is in the electrical-sport mode, the maximum output power of the power battery is less than a second predetermined power, wherein the second predetermined power is greater than the first predetermined power; and wherein when the hybrid electrical vehicle is in at least one of the hybrid electrical-economical mode and the hybrid electrical-sport mode, when the hybrid electrical vehicle is in the hybrid electrical-economical mode, each of the maximum output power of the power battery and a maximum output power of the engine is less than the first predetermined power, and a maximum output torque of the engine is less than a first torque threshold, or when the hybrid electrical vehicle is in the hybrid electrical-sport mode, the maximum output power of the power battery is less than the second predetermined power, and the control module allows the engine to output the maximum output torque and the maximum output power.

17. The method according to claim 16, wherein the hybrid electrical vehicle is controlled to switch to the hybrid electrical-economical mode from the electrical-economical mode if a current electric quantity of the power battery is less than or equal to a first electric quantity threshold, or a maximum allowable discharge power of the power battery is less than or equal to a first power threshold, or a slope detected by the hybrid electrical vehicle is greater than or equal to a maximum slope.

18. The method according to claim 17, wherein the hybrid electrical vehicle is controlled to switch to the hybrid electrical-sport mode from the electrical-sport mode if the current electric quantity of the power battery is less than or equal to the first electric quantity threshold, the maximum allowable discharge power of the power battery is less than or equal to the first power threshold, or the slope detected by the hybrid electrical vehicle is greater than or equal to the maximum slope.

19. The method according to claim 16, wherein the hybrid electrical vehicle is controlled to drive with a limited power if the hybrid electrical vehicle is in the electrical-economical mode.

20. The method according to claim 16, wherein if the hybrid electrical vehicle is in the electrical-economical mode or the electrical-sport mode and a mode switching instruction is received, the hybrid electrical vehicle is controlled to switch to the working mode corresponding to the mode switching instruction.

21. A hybrid electrical vehicle, comprising:

a transmission device connected with wheels of the hybrid electrical vehicle;

an engine and a gearbox, wherein the engine is connected with the transmission device via the gearbox;

an electric motor and a gear reducer, wherein the electric motor is connected with the transmission device via the gear reducer;

a power battery configured to supply power to the electric motor; and a control module configured to control the electric motor and the engine according to a working mode selected by a user from a plurality of working modes and to control the hybrid electrical vehicle to switch between the plurality of working modes according to a driving state of the hybrid electrical vehicle and/or a working state of the power battery, wherein the plurality of working modes comprise an electrical-economical mode, an electrical-sport mode, a hybrid electrical-economical mode and a hybrid electrical-sport mode, wherein if the hybrid electrical vehicle is in the hybrid electrical-economical mode, wherein the control module is configured to control the hybrid electrical vehicle to operate in a first manner if a slope detected by the hybrid electrical vehicle is less than or equal to a minimum slope, a current electric quantity of the power battery is larger than or equal to the second electric quantity threshold, and a maximum allowable discharge power of the power battery is larger than or equal to a second power threshold; and the control module is configured to control the hybrid electrical vehicle to operate in a second manner if the slope detected by the hybrid electrical vehicle is less than or equal to the minimum slope and the current electric quantity of the power battery is less than or equal to the first electric quantity threshold or if the current slope detected by the hybrid electrical vehicle is less than or equal to the minimum slope and the maximum allowable discharge power of the power battery is less than or equal to the first power threshold;

wherein the second electric quantity threshold is larger than the first electric quantity threshold, and the second power threshold is larger than the first power threshold.

* * * * *